United States Patent [19]
Sakaino et al.

[11] Patent Number: 6,128,578
[45] Date of Patent: Oct. 3, 2000

[54] METEOROLOGICAL RADAR PRECIPITATION PATTERN PREDICTION METHOD AND APPARATUS

[75] Inventors: Hidetomo Sakaino, Yokosuka; Satoshi Suzuki; Tsutomu Horikoshi, both of Yokohama, all of Japan

[73] Assignee: Nippon Telegraph and Telephone Corporation, Japan

[21] Appl. No.: 08/964,470

[22] Filed: Nov. 4, 1997

[30] Foreign Application Priority Data

| Dec. 26, 1996 | [JP] | Japan | 8-347684 |
|---|---|---|---|
| Feb. 13, 1997 | [JP] | Japan | 9-029126 |
| Feb. 13, 1997 | [JP] | Japan | 9-029127 |
| Feb. 13, 1997 | [JP] | Japan | 9-029128 |
| Mar. 18, 1997 | [JP] | Japan | 9-064665 |
| Apr. 16, 1997 | [JP] | Japan | 9-099053 |
| Jul. 9, 1997 | [JP] | Japan | 9-183986 |

[51] Int. Cl.[7] .................................................. G06F 19/00
[52] U.S. Cl. ........................................................ 702/3
[58] Field of Search ...................... 702/2, 3, 4; 706/931; 342/26

[56] References Cited

U.S. PATENT DOCUMENTS

| 5,406,481 | 4/1995 | Shinozawa et al. . | |
| 5,440,483 | 8/1995 | Badoche-Jacquet et al. . | |
| 5,839,089 | 11/1998 | Yasuda et al. | 702/3 |
| 5,850,619 | 12/1998 | Rasmussen et al. | 702/3 |

OTHER PUBLICATIONS

H. Sakaino, et al., "A prediction method of radar precipitation images using and iterative advection velocity assumption method", Proceedings of the 1997 Information and System Society Conference of IEICE, p. 165, 1997 (with summary in English on a separate sheet).

M. Shiiba, et al., "Investigation of short–term rainfall prediction method by a translation model", Proceedings of the 28th Meeting of the Hydraulics Society, pp. 423–428, Feb., 1984 (with summary in English on a separate sheet).

T.M.Hamill, et al., "A short–term cloud forecast scheme using cross correlations", Weather And Forecasting, vol. 8, No. 4, pp. 401–411, Dec. 1993.

T. Takasao, et al., "Short–term rainfall prediction by radar raingauge", Annual Report Of Disaster Prevention Research Inst., Kyoto University, vol. 26 B–2, pp. 165–180, Apr., 1983.

Y. Asuma, et al., Experiments for a very–short–range prediction of snowfall using a simple weather radar system Part 2. —Examples of Actual Prediction—, Geographical Bulletin of Hokkaido University, vol. 44, pp. 53–65, Oct., 1984.

"Brain And Neural Network" edited by S. Amari, et al., Asakura Publishing, pp. 186–188 (with summary in English on a separate sheet).

*Primary Examiner*—Donald E. McElheny, Jr.
*Attorney, Agent, or Firm*—Pennie & Edmonds LLP

[57] ABSTRACT

Meteorological radar precipitation pattern prediction methods and apparatus are provided, by which operational costs can be reduced, a series of physical processes in a precipitation region and topographical influences can be considered. The main method has the steps of inputting radar images of a precipitation region storing the input radar images as time-series two-dimensional images; calculating various image-feature quantities with respect to two or more of the stored two-dimensional past images; calculating a spatial-temporal transition of the amount of precipitation using an advection-diffusion equation system which indicates various physical effects relating to precipitation phenomena, with the various image-feature quantities as initial values; predicting transition of a pattern with respect to the precipitation region based on results of the calculation; and outputting predicted results as time-series images. Preferably, the advection-diffusion equation system includes time, advection, diffusion, source, sink, and dispersion terms, and a gray-level at each pixel is supplied to the equation as a variable corresponding to an amount of precipitation. If the advection-diffusion equation system includes an advection term which is a product of an advection vector and the first derivative with respect to a gray-level of a relevant pixel in a precipitation pattern, the amount of precipitation is varied according to transition of advection vectors.

74 Claims, 29 Drawing Sheets

- IMAGE INPUT SECTION — 100
- IMAGE STORAGE SECTION — 110
- IMAGE TRANSITION DETECTING SECTION — 120
- IMAGE GENERATING/VANISHING SECTION — 130
- OUTPUT SECTION — 140

(t-1) → (t)

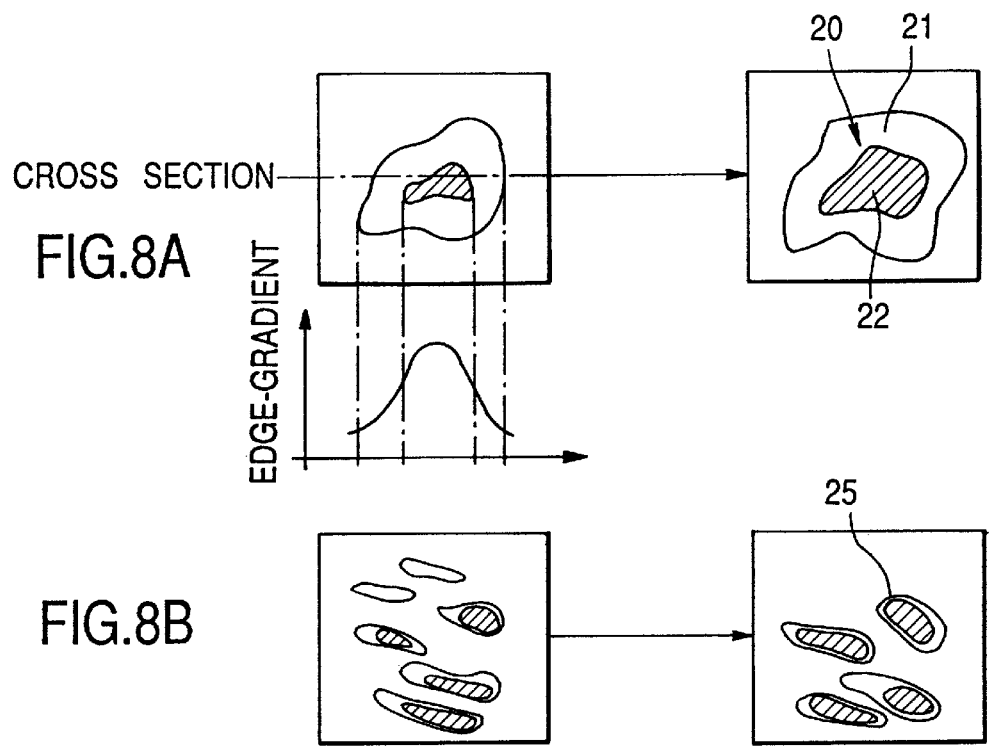
FIG.8A
FIG.8B
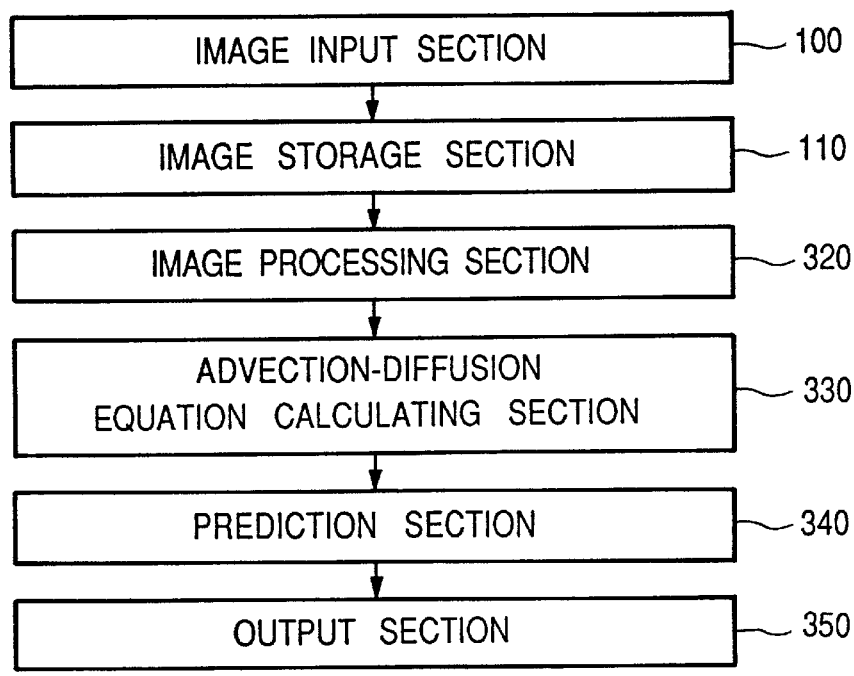
FIG.13

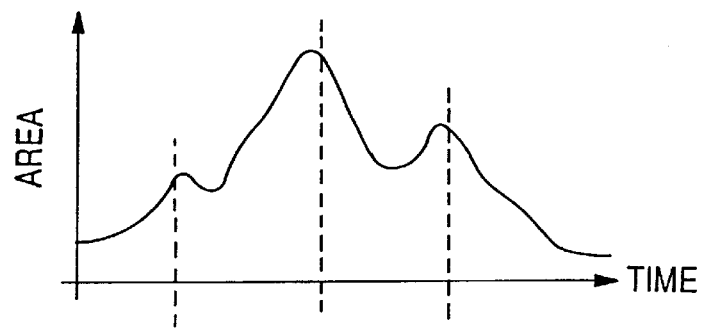
FIG. 9(A)
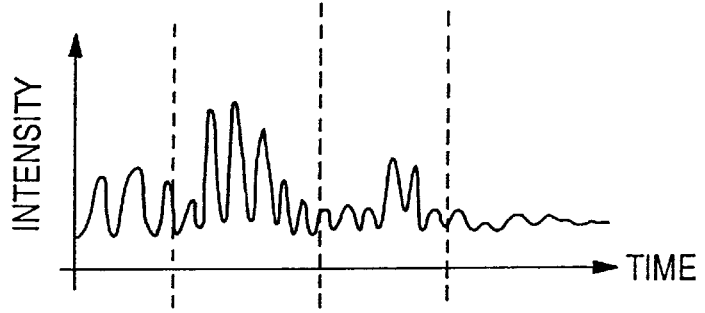
FIG. 9(B)
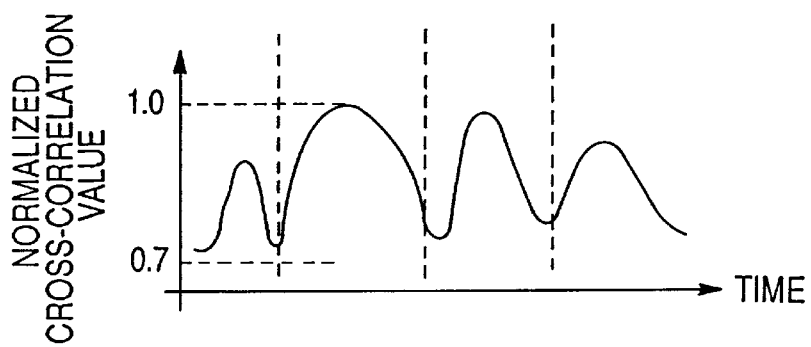
FIG. 9(C)
FIG.10
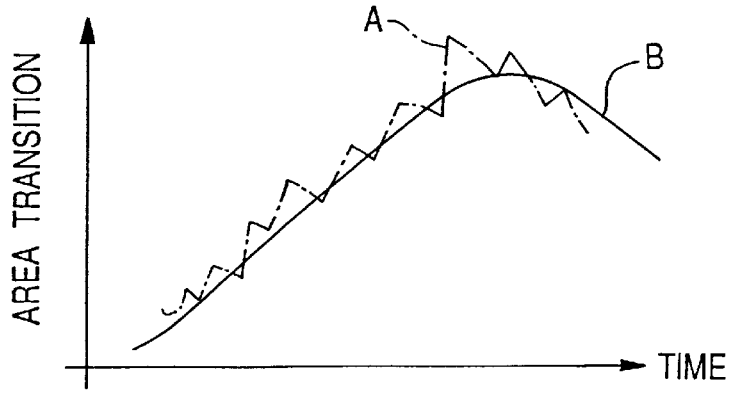

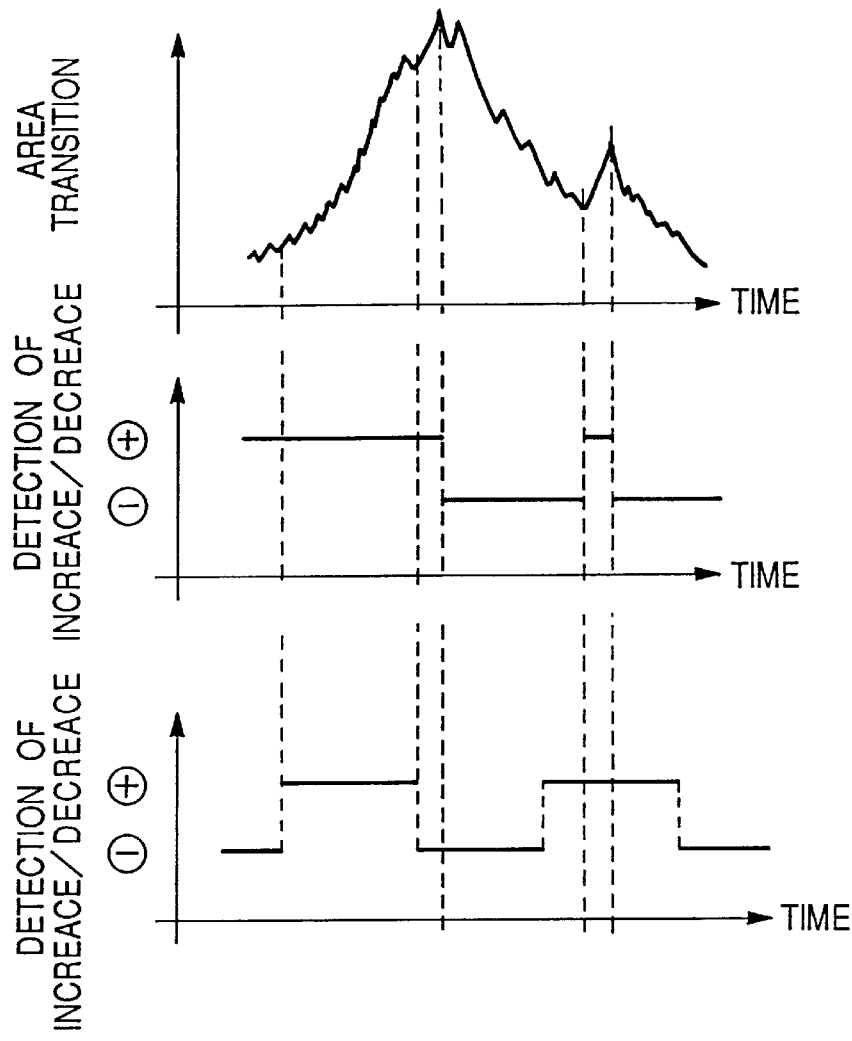
FIG.11(A)
FIG.11(B)
FIG.11(C)
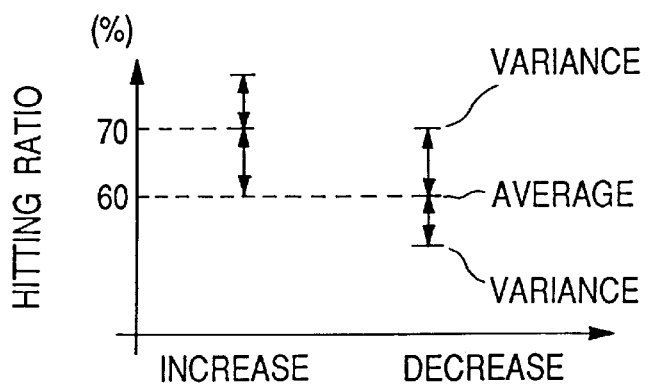
FIG.12

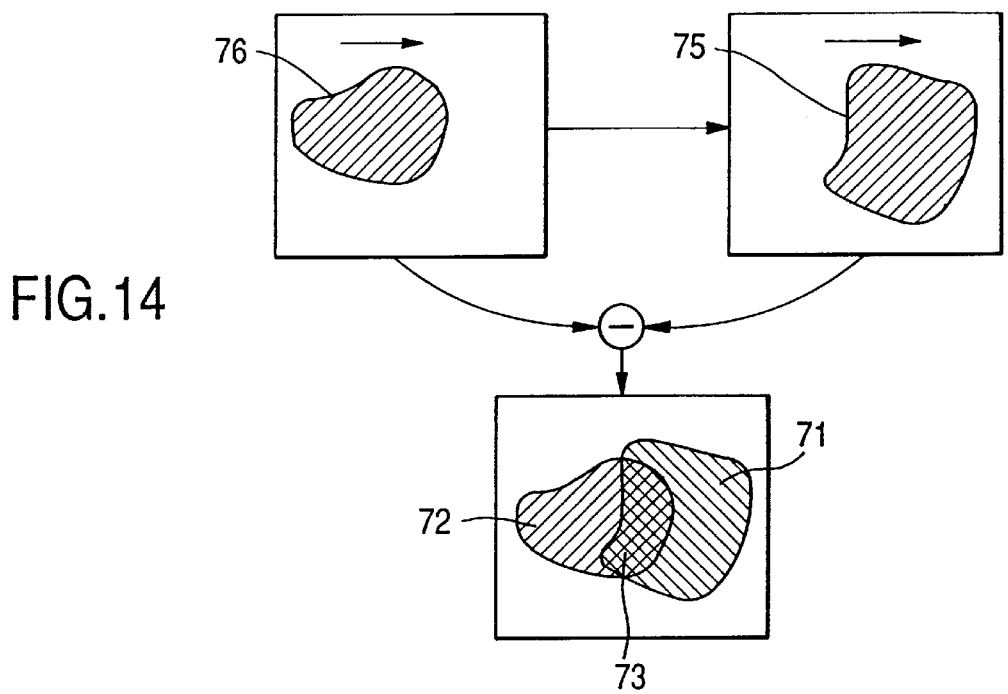
FIG.14
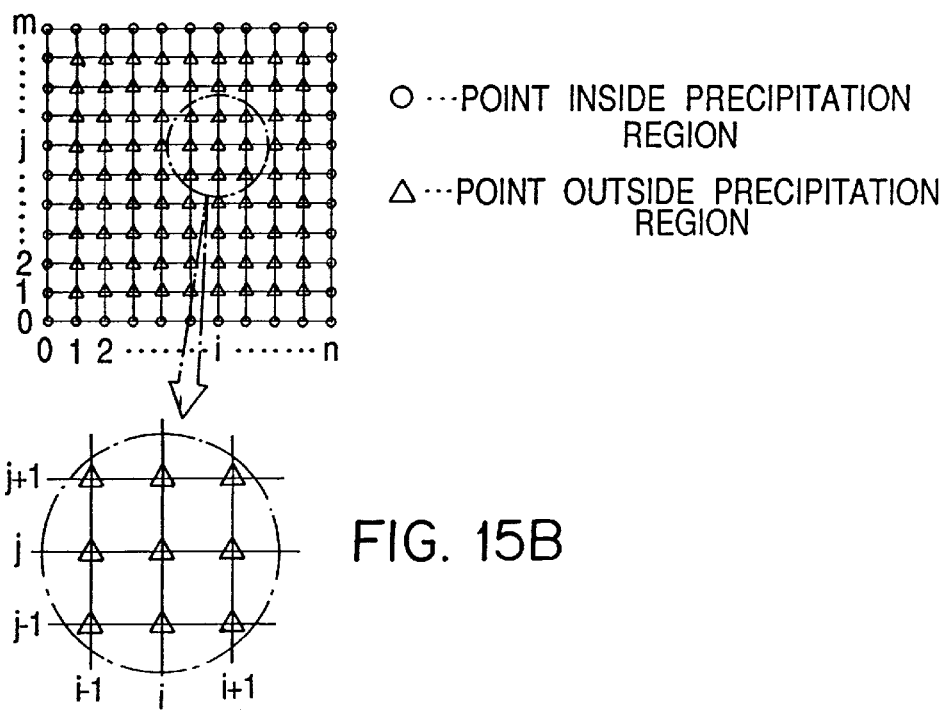
○ ··· POINT INSIDE PRECIPITATION REGION
△ ··· POINT OUTSIDE PRECIPITATION REGION
FIG. 15A
FIG. 15B

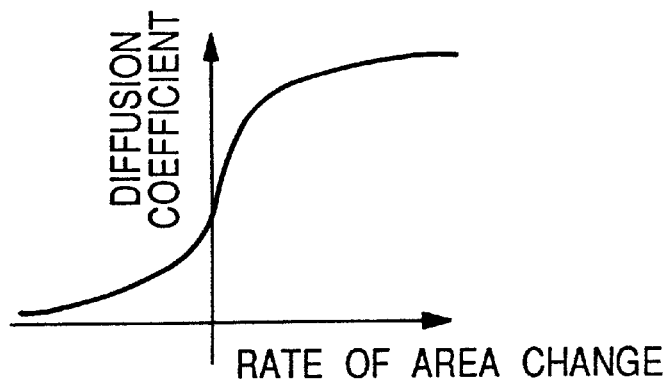
FIG.33
FIG.34A
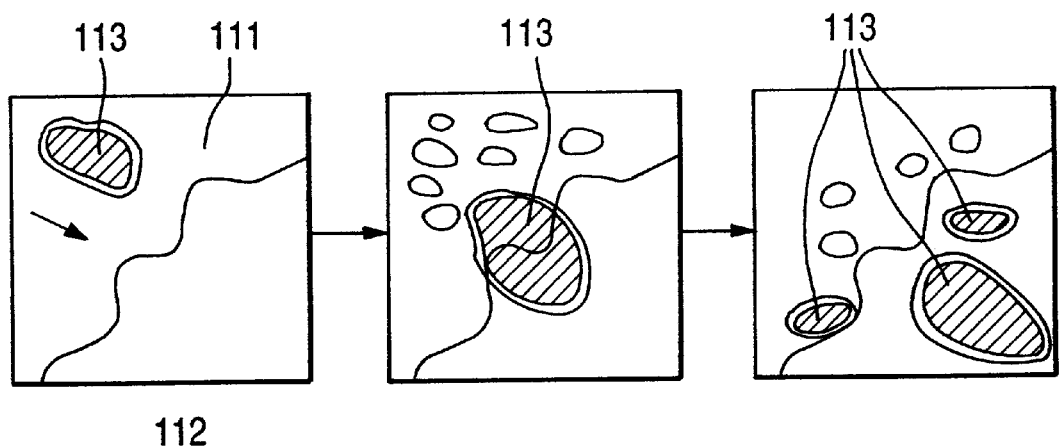
FIG.34B
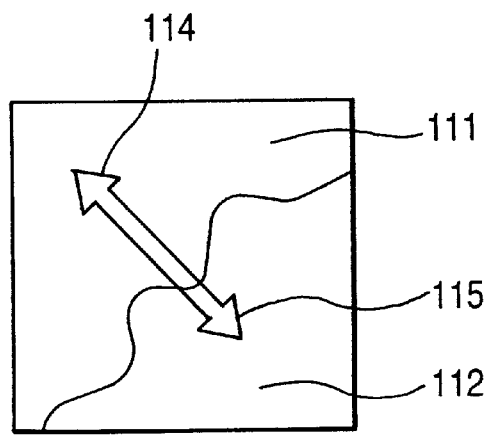

FIG.43

| | ITEM | SET-UP CONDITION |
|---|---|---|
| BEFORE PREDICTION | NECESSARY NUMBER OF FRAMES | 6 FRAMES (INCLUDING SMOOTHING) |
| AFTER PREDICTION — TIME | TIME SPAN | $\delta t = 15$ SEC |
| | PREDICTION TIME | 15SEC ~ 4 HOURS AHEAD |
| | NUMBER OF TIME INTEGRALS | 960 |
| AFTER PREDICTION — TOPOGRAPHICAL EFFECT | DIFFUSION COEFFICIENT | $\alpha = 0.5$<br>$\beta = 1.5$ |
| | ADVECTION VELOCITY | $\gamma = 0.8$<br>$\varphi = 2.0$<br>$\eta = 0.5$ |
| | TOPOGRAPHICAL FEATURE | MOUNTAIN, PLAIN, SEA IN 500 METER CROSS-SECTION |
| AFTER PREDICTION — MOVING (ADVECTION) VELOCITY | REPETITIVE PROPAGATION OF ADVECTION VELOCITIES | K = 10 (TIMES) |
| | SUBBLOCK MATCHING | EVERY 15 PIXELS |
| AFTER PREDICTION — GROWTH/ DECAY | *SOURCE* TERM | GRAY-LEVEL > 130<br>GRADIENT < 50 |
| | *SINK* TERM | -5 |
| | *DISPERSION* TERM | RANDOM NUMBER: N (0, 5) |

FIG.45A
| EFFECT CONDITION \ RESULT | [a] | [b] | [c] | [d] | [e] | [f] |
|---|---|---|---|---|---|---|
| DIFFUSION | ○ | ○ | ○ | ○ | ○ | ○ |
| ADVECTION | × | ○ | ○ | ○ | ○ | ○ |
| TOPOGRAPHY | × | × | ○ | ○ | ○ | ○ |
| SOURCE | × | × | × | SEA | ALL | ALL |
| SINK | × | × | × | × | × | ○ |
FIG.45B
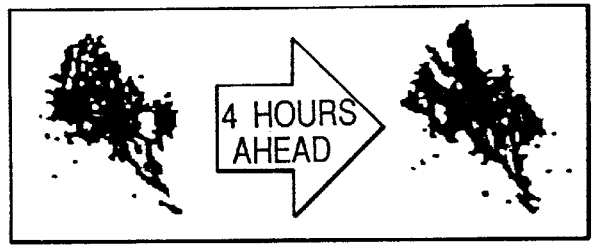
FIG.45C
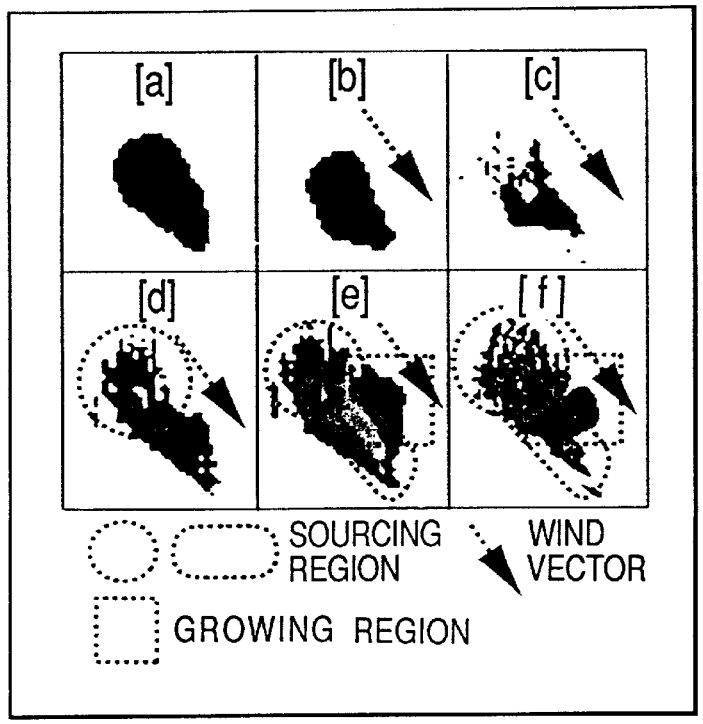

METEOROLOGICAL RADAR PRECIPITATION PATTERN PREDICTION METHOD AND APPARATUS

BACKGROUND OF THE INVENTION

1. Field of the Invention

The present invention relates to techniques for automatically predicting a transition of up to several hours (or a short time) ahead of a precipitation region included in a narrow region which is sensitively affected by changes in the weather, and relates to methods and apparatus for predicting changes of a precipitation region as a non-rigid object, such as growth or dispersion.

This application is based on Japanese Patent Applications Nos. Hei 8-347684, Hei 9-29126, Hei 9-29127, Hei 9-29128, Hei 9-64665, Hei 9-99053, and Hei 9-183986, the contents of which are incorporated herein by reference.

2. Description of the Related Art

In conventional weather forecasting performed by, for example, the Japanese Meteorological Agency, transitions of meteorological phenomena of dozens of hours in advance or a few days in advance for each area in Japan are predicted via mathematical/physical equations using various two- or three-dimensional physical parameters (e.g., temperature, atmosphere, dew point, wind vector) which are obtained by the satellite Amedas or another meteorological satellite. Currently, shorter time-range weather forecasting on the order of minutes for a narrower region has been desired, and thus forecasting based on information of changes of a precipitation region (where rainfall or snowfall is generated), which is obtained via locally-arranged meteorological radar apparatus, has become important. Such forecasting is called "nowcasting", and changes of meteorological phenomena are observed so as to prevent disasters beforehand.

The meteorological radar emits pulses to a precipitation region in the sky a few kilometers above the ground so as to observe the strength of rainfall or snowfall according to reflective (or echo) intensities of the pulses (the intensities being converted into gray levels in the image). The precipitation region has apparently a cloud-like shape. An image of the precipitation region is represented as a combination pattern of various shapes and gray-levels (such a pattern will be called a "precipitation pattern", hereinafter). The reflection region is normally within a radius of a hundred kilometers. In most echo images, a conversion is performed in order that the amount of precipitation and the displayed gradation level are proportionate to each other, and the precipitation region corresponds to a part having the gradation levels (called "gray-levels", hereinafter) higher than a specified level.

Information on the precipitation pattern is updated every few minutes, and this feature is useful, for example, for scheduling departure/arrival of space shuttles or airplanes, or for preventing flood damage beforehand. However, it is difficult to represent clear feature quantities with respect to a precipitation pattern; thus, automatic prediction of a precipitation region based on image processing methods is also difficult. In most cases of conventional evaluation of moving vectors with respect to a rigid object included in an image, a model, on which illumination effects almost equally act for each part, is adopted. Conventional methods for detecting the moving vectors are mainly based on the Cross Correlation method (i.e., the CC method) (refer to D. H. Ballard, et al., "*Computer Vision*" Prentice-Hall, Inc.)

On the other hand, a follow-up method necessary for automatic prediction of a non-rigid object such as a precipitation pattern should be different from a method for following movement of a rigid object such as a motorcar, etc., or an elastic body observed in an echo image of the heart, or the like, and should make it possible to follow transition of the non-rigid object with detecting generation or disappearance of a pattern corresponding to the object. As for these demands, predicted results satisfying a desirable accuracy cannot be obtained in practice. Therefore, even now, manual and subjective detection according to transition of the precipitation region, based on experience of humans, is performed, and detected information is used in practice.

In the meantime, automatic and objective prediction methods for transition of a precipitation region using computers have been tested.

Representative precipitation patterns are (i) cyclonic disturbance generated within a radius of ten or hundred kilometers (called "meso-$\beta$ scale") and topographical ascending current (called "meso-$\gamma$ scale") observed at mountains. These phenomena are also characterized by having a short life of several minutes or hours. Accordingly, in order to precisely predict the phenomena of meso-$\beta/\gamma$ scale, a model which can represent an ever-changing narrow region within a radius of kilometers, where generation or disappearance of a pattern is observed, is required.

Until now, methods using image processing techniques and using physical equations have been proposed as such a precipitation pattern prediction method.

In the simplest method using image processing techniques, two consecutive images are subjected to pattern matching based on the CC method so as to evaluate moving vector(s), and by using a one-dimensional extrapolation method, a precipitation pattern (of the same shape and size) is translated. Here, displacement (of a precipitation pattern for the evaluation) per frame is regarded as a wind speed in a horizontal direction.

More specifically, regarding two (image) frames f(t) and f(t+1), which are functions at time (t) (at each step), a correlation value (or a correlation coefficient) is calculated so as to evaluate similarity of the gray-levels between these frames, and displacement of the relevant precipitation region is evaluated on the assumption that points having the highest correlation values in the frames correspond to each other. Then, based on the evaluated displacement, translation movement of the precipitation region is performed. By repeating the above operations using an image of the precipitation region of the next step obtained by the above evaluation, it is possible to predict precipitation-region images belonging to a specified number of steps ahead. That is, according to a two-dimensional image at a time, changes of several minutes or hours ahead of the precipitation region is predicted also as a two-dimensional image.

In the CC method applied to practical use, one moving vector is assumed from two consecutive images. Generally, generation/disappearance phenomena constantly occur in a precipitation region. Therefore, regarding the gray-level of images, gray-levels of a prior frame and the next frame are not always in one-to-one correspondence. Additionally, in a diffuse precipitation-region image for which the correlation coefficient cannot be evaluated, assumption of moving (i.e., advection) vectors is difficult and a suitable interpolation method for such a region has not previously been proposed.

Furthermore, in the prediction process according to the two-dimensional images as described above, the identical pattern is simply translated; thus, only spread of the precipitation region is predicted but degree of a change in the state of the precipitation region is not predicted. That is, unstable changes regarding size, shape, gray-level, and the like, which represent the natural phenomena, cannot be sufficiently predicted, and topographical influences on the precipitation region are also not considered. Accordingly, regarding the two-dimensional information as images, a series of physical phases of source, sink, dispersion, growth, and decay have not been represented.

For example, in the case of a stationary precipitation region, the growth and disappearance are violent in comparison with overall displacement of the precipitation region. That is, the gray-levels of such a precipitation region considerably change in comparison with the change of its contour shape. Therefore, if the above CC method is directly applied to such a precipitation region, multiple (unsuitable) moving vectors may be obtained because the gray-levels may be changed even if the entire pattern has not moved. As a result of moving the precipitation region based on the obtained (unsuitable) moving vectors, the predicted precipitation region becomes more and more out of place as the prediction proceeds.

Similarly, prediction in consideration of increasing/decreasing process relating to the precipitation area, which relates to the amount of precipitation, is also not realized. Therefore, if prediction is continued using a precipitation pattern in the growing phase, the size of the precipitation pattern does not become small even though the actual phase enters a decaying phase. Conversely, even though the actual phase proceeds from the decaying phase to a growing phase again, the size of the precipitation pattern does not become large and consequently, prediction error increases at a remarkable switching phase between the above phases. That is, in the conventional linear prediction method, a non-linear change of the area cannot be predicted before and after the status of the area change of a precipitation region shifts from increase to decrease, or from decrease to increase. Consequently, there has been a problem in that increase of the prediction error is inevitable.

That is, it can be said that moving vectors suitable for meteorological patterns which non-rigidly change cannot be defined. This is because even between consecutive images, plural attributes of contour, gray-level, and the like of the object simultaneously change, thus clear correspondence between the images cannot be defined. Accordingly, by using the above automatic method, it is still difficult to define detailed correspondence between precipitation patterns of the frames, and evaluation of moving (i.e., advection) velocities with respect to precipitation patterns based on human experience is mainly used in practice.

On the other hand, if various advection vectors exist ini a precipitation pattern, a subblock matching method (in which a frame is divided into plural blocks) based on the CC method and the linear extrapolation method are used together. Regarding the accuracy of the moving vectors evaluated using the subblock matching method, it has been reported that the error between the moving vectors (of the subblock matching method) and moving vectors detected using the Doppler radar is small.

The reasons for adopting the CC method are (1) statistical estimation is effective because in most cases, definition of clear correspondence between frames is difficult due to the generation and disappearance phenomena, (2) large sampling interval (or period) can be adopted, etc.

In the meantime, the following are incapabilities of the (CC method: (1) if gray-levels in a precipitation pattern are distributed over a wide range, a reliable correlation coefficient cannot be obtained, (2) even though an image is divided into plural blocks using the subblock matching method, moving vectors for each pixel cannot be evaluated, and (3) displacement of concave/convex parts in the contour cannot be detected.

On the other hand, if the precipitation pattern is moved only by using the linear extrapolation method, the following problems occur: (1) the precipitation pattern unnaturally moves out of the image frame, (2) evaluated moving vectors cross each other, etc. Therefore, only by performing linear and translation movement of the precipitation pattern, improvement of the prediction accuracy has its limit.

Additionally, when the CC method and the linear extrapolation methods are used together, a simple model based on the assumption that the change of the precipitation region has been fixed (the gray-levels and the contour shape are not changed). That is, a non-physical prediction model against ever-changing meteorological phenomena has been used. Furthermore, insufficient statistical information has been known with respect to temporary growth of a precipitation region observed in its decaying phase, and thus prediction for such a condition has not been tried.

On the other hand, as an example of using a physical model, those using a diffusion equation or an advection equation have been reported. In the method reported in Y Asuma, et al., "*Experiments for a Very-short-range Prediction of Snowfall Using a Simple Weather Radar System Part 2. —Examples of Actual Prediction—*, Geographical Bulletin of Hokkaido University, Vol. 44, pp. 53–65, October, 1984", the diffusion equation and the CC method are used together, where the diffusion coefficient in the equation is fixed regardless of characteristics of a precipitation pattern. There has been a problem in that if this diffusion coefficient is not appropriately determined, obtained diffusivity tends to be larger than the actual. Here, transition of precipitation of a precipitation pattern is obtained as a solution of the diffusion equation and the entire precipitation pattern is uniformly translated by using the CC and linear extrapolation methods. Accordingly, there remain problems in that processes for objectively determining diffusion coefficients suitable for various precipitation patterns have not yet been found, and such a simple linear extrapolation method is directly used in the prediction.

Furthermore, two-dimensional images as sections of three-dimensional phenomena are analyzed; thus, it has been unnatural to represent such a three-dimensional physical diffusion phenomenon by using the diffusion equation. Additionally, the diffusion equation has scarcely been applied to a disappearance phase.

On the other hand, in T. Takasao et al., "*SHORT-TERM RAINFALL PREDICTION BY A RADAR RAINGAUGE*", Annual Report of Disaster Prevention Research Inst., Kyoto University, Vol. 26 B-2, pp. 165–180, April, 1983, growth and decaying terms are considered and defined in an advection equation, and a linear prediction equation, approximated by a linear function with a variable of precipitation intensity, is used on the assumption that a solution of the equation exists on the relevant basic characteristic curve. In this case, the moving velocity is evaluated based on the CC method.

In this method, a region to be analyzed is divided to be a mesh form, and parameters used in the linear function are independently determined for each section in the mesh. In this way, local changes are also considered. However, a simplified linear prediction equation is used on the assumption that changes of the precipitation intensity in each section (of the mesh) are insignificant; thus, application of this method to a precipitation pattern with a high changing rate of precipitation intensity is questionable. According to such simplification of the equation, effects caused by the growth and decay terms are not explicitly reflected to predicted results.

As described above, the prediction methods based on the CC and linear extrapolation methods or the simplified physical equation are convenient but similar to the method for predicting movement of a rigid object. Therefore, the model in this case cannot flexibly applied to:

(1) a precipitation pattern like rapidly growing and expanding in a short time, as those found in the meso-$\beta/\gamma$ scale,
(2) a case in which the precipitation intensity is locally changed in accordance with a growing or decaying phase, or
(3) non-linear movement of a precipitation pattern.

There is another problem in this case in which diffusion and advection effects are not considered together. That is, an actual transition, in which the precipitation pattern locally changes while both the wind speed and the amount of precipitation respectively and simultaneously change, cannot be predicted. Therefore, it is difficult to apply the conventional methods to a highly-unsteady precipitation pattern. In addition, advection velocities detected using the subblock matching method can be passably reliable; however, the advection velocity per pixel should be detected using another method.

On the other hand, prediction methods based on a neural network model are known, in which it has been tested to represent a mapping relationship between time-series-arranged two-dimensional images using weight coefficients of a neural network. However, the best suited structure of the neural network cannot be easily estimated and only a predicted image as an average of learned patterns can be obtained. More specifically, a feedforward network, one of representative time-series learning models, has the ability to map a spatial pattern, but a time-series pattern cannot be learned by using such a network (refer to "*Brain and Neural Network*" edited by S. Amari, et al., Asakura Publishing). That is, only prediction on conditions of fixed gray-levels and a fixed center of gravity for a precipitation pattern has been realized; thus, prediction of precipitation patterns using a neural network model cannot be put to practical use for the present.

Furthermore, precipitation patterns may be subjected to topographical influences of mountains, seas, and the like. However, in the prediction process using the linear extrapolation method, a measure such that different moving vectors are used for regions on the sea and the land can be taken at the best. Also in the neural network models, it is unclear how deeply topographical effects are considered, and moreover, flexibility of mathematical expressive-capability is insufficient regarding, for example, how a physical effect which is too complicated to learn is reflected in the model.

SUMMARY OF THE INVENTION

In consideration of the above problems, it is a primary object of the present invention to provide meteorological radar precipitation pattern prediction methods and apparatus which make it possible to:
(1) systematically represent a series of physical processes in a precipitation region,
(2) perform prediction by accurately evaluating moving speed of a local precipitation region based on a radar image without using the CC method, and also by accurately evaluating overall moving speed via a fluid equation, and
(3) take topographical influences into prediction.

It is another object of the present invention to greatly reduce the operational cost for establishing an automatic/computational prediction for transition of a precipitation pattern.

Accordingly, the present invention provides a meteorological radar precipitation pattern prediction apparatus comprising: image input means for inputting radar images of a precipitation region; image storage means for storing the input radar images as time-series two-dimensional images; image processing means for calculating various image-feature quantities with respect to two or more two-dimensional past images stored in the image storage means; calculation means for calculating a spatial-temporal transition of the amount of precipitation using an advection-diffusion equation system which indicates various physical effects relating to precipitation phenomena, with the various image-feature quantities as initial values; prediction means for predicting transition of a pattern with respect to the precipitation region based on results calculated by the calculation means; and output means for outputting predicted results as time-series images.

The present invention also provides a meteorological radar precipitation pattern prediction method comprising the steps of inputting radar images of a precipitation region; storing the input radar images as time-series two-dimensional images; calculating various image-feature quantities with respect to two or more of the stored two-dimensional past images; calculating a spatial-temporal transition of the amount of precipitation using an advection-diffusion equation system which indicates various physical effects relating to precipitation phenomena, with the various image-feature quantities as initial values; predicting transition of a pattern with respect to the precipitation region based on results of the calculation; and outputting predicted results as time-series images.

The advection-diffusion equation system may include time, advection, diffusion, source, sink, and dispersion terms, and a gray-level at each pixel is supplied to the equation as a variable corresponding to an amount of precipitation.

If the advection-diffusion equation system includes an advection term which is a product of an advection vector and the first derivative with respect to a gray-level of a relevant pixel in a precipitation pattern, the amount of precipitation is varied according to transition of advection vectors.

The advection vectors, diffusion coefficients, and dispersion coefficients may be set (or changed) in accordance with a topographical feature of the precipitation region. In this case, topographical effects caused by sea, mountain, and the like can be reflected in the prediction.

Diffusion coefficients included in the diffusion term may be set in accordance with a rate of change with respect to one-dimensional area transition.

In addition, one-dimensional non-linear area transition may be predicted using extrapolation by approximately fitting a predetermined non-linear function up to a predetermined prediction time, whereby the rate of change with respect to one-dimensional area transition is obtained and corresponding diffusion coefficients are changed according to the obtained rate.

The image-feature quantities may include an edge-gradient which is the first derivative of a gray-level.

The following method is also preferable:
(i) the pattern of the precipitation region is divided into one or more regions having a large edge-gradient and one or more regions having a small edge-gradient with respect to a predetermined value, and first initial advection vectors are determined by extracting a change of the center of gravity of each region having the large edge-gradient;

(ii) second initial advection vectors are determined by dividing each frame into plural small blocks and calculating a direction and a distance relating to points having the highest similarity between two frames of the images based on the cross correlation method;

(iii) third initial advection vectors are determined by extracting contours of the precipitation pattern in two of the images and assuming displacements between the contours as the advection vectors; and an operation using a moving average filter is iterated with respect to the first, second and third initial advection vectors so as to evaluate overall advection vectors throughout the frame.

According to the above invention, with a non-linear and non-stationary prediction model in accordance with physical features of a precipitation pattern, local increase/decrease of the amount of precipitation, and reduction of a precipitation region as decay or disappearance can accurately be predicted and prediction suitable for practical use for a longer time can be realized.

The present invention also provides the following apparatuses (1)–(3) which comprise image input means, image storage means, and other means explained later, and which do not use the advection-diffusion equation system.

(1) A meteorological radar precipitation pattern prediction apparatus further comprising: image processing means for outputting area-transition information of a precipitation region with respect to two or more two-dimensional past images stored in the image storage means as one-dimensional time-series signals; function fitting means for fitting a non-linear function into the one-dimensional time-series signals by using the least square method; prediction means for predicting future area-transition based on results of the function fitting; and output means for outputting a pattern transition of the precipitation region as time-series images based on predicted results. (A method corresponding to this apparatus is also provided.)

(2) A meteorological radar precipitation pattern prediction apparatus further comprising: image transition detecting means for detecting an intensity transition between two or more two-dimensional past images stored in the image storage means; image generating and vanishing means for generating or vanishing a local precipitation-region image according to the detected intensity transition by using an image processing method; and output means for outputting a pattern transition of the precipitation region as time-series images based on predicted results. Preferably, the image generating and vanishing means iterates convolution integral calculation and inverse integral calculation thereof with respect to a Gaussian function and image data of the precipitation region.

(3) A meteorological radar precipitation pattern prediction apparatus further comprising: image processing means for detecting and outputting intensity and area transitions between two or more two-dimensional past images stored in the image storage means as one-dimensional time-series signals; precipitation-region growth and decay predicting means for predicting transition with respect to growth and decay of the precipitation region based on the one-dimensional time-series signals; and output means for outputting a pattern transition of the precipitation region as time-series images based on predicted results.

These apparatuses (or the method) can also be easily realized at low cost, and high-speed processing is possible with simpler algorithms.

The present invention also provides, as an application of the above-mentioned invention, a gas-distribution pattern prediction method comprising the steps of inputting gas-distribution images of gas distributed in the air storing the input images as time-series two-dimensional images; calculating various image-feature quantities with respect to two or more of the stored two-dimensional past images; calculating a spatial-temporal transition of the distributed gas using an advection-diffusion equation system which indicates various physical effects relating to gas discharged into the air, with the various image-feature quantities as initial values; predicting transition of a pattern with respect to the gas distribution based on results of the calculation; and outputting predicted results as time-series images. (An apparatus for implementing this method is also provided.) As a gas, carbon monoxide, nitrogen oxides, and sulfur oxides, and the like discharged into the air may be considered. That is, by inputting the gas-distribution images of gas in the air, which has characteristics similar to the intensity distribution of a precipitation region, and by using the advection-diffusion equation in a similar method, influences of chemical substances on an observed region can be predicted.

BRIEF DESCRIPTION OF THE DRAWINGS

FIGS. 8A and 8B are typical illustrations showing changes between two frames of a precipitation region, which were observed in projected real radar echo images.

FIGS. 9(A)–(C) indicate transitions of area, intensity, and normalized cross-correlation value between the area and intensity in embodiment 2.

FIG. 10 shows an example in which an equation for approximation with respect to area transition is fit into an observation result.

FIGS. 11(A)–(C) show, regarding the area transition, results of detection and prediction by a method in which a difference between the present area and data relating to a predetermined number of frames earlier.

FIG. 12 is a graph diagram for indicating a hitting ratio of the area-increase/decrease prediction based on the intensity transition as shown in FIG. 11.

FIG. 13 is a block diagram showing a construction of the meteorological radar precipitation pattern prediction apparatus in embodiment 3 according to the present invention.

FIG. 14 is a typical illustration showing states of extraction of a difference between two consecutive frames.

FIGS. 15A and 15B are a typical illustration showing a discrete state of an image and assignment of boundary conditions necessary for solving the advection-diffusion equation.

FIG. 33 is a typical graph diagram showing a relationship between the rate of the area change and the diffusion coefficient.

FIGS. 34A and 34B are typical diagrams for explaining a relationship between topographical effects and relevant parameters.

FIG. 43 is a list showing conditions as parameters used in the practical example.

FIG. 45A shows conditions relating to presence/absence of each physical effect on a stripe precipitation pattern, and FIGS. 45B and 45C are diagrams showing real transition and predicted results relating to the pattern.

DESCRIPTION OF THE PREFERRED EMBODIMENTS

Hereinbelow, preferred embodiments of the present invention will be explained in detail with reference to the drawings.

Embodiment 1

In this embodiment, (partial) image generating and vanishing operations are systematically performed based on image processing methods. This can be easily performed, for example, by iterating convolution integral and inverse integral thereof with respect to a Gaussian function and image data of a precipitation region. Here, such a process is used as an effect for shading off an image in the image processing field.

A gray-level of an image is in proportion to the corresponding intensity of the precipitation region, and the gray-level lowers by iterating the convolution integral. Therefore, in order to maintain the average intensity more than a fixed level, the generating and vanishing operations for the precipitation region are performed while supplying an intensity data, that is, by raising the intensity. The gray-levels, that is, the intensities, are changed according to at function defined by adding differences between frames.

Figure 1:
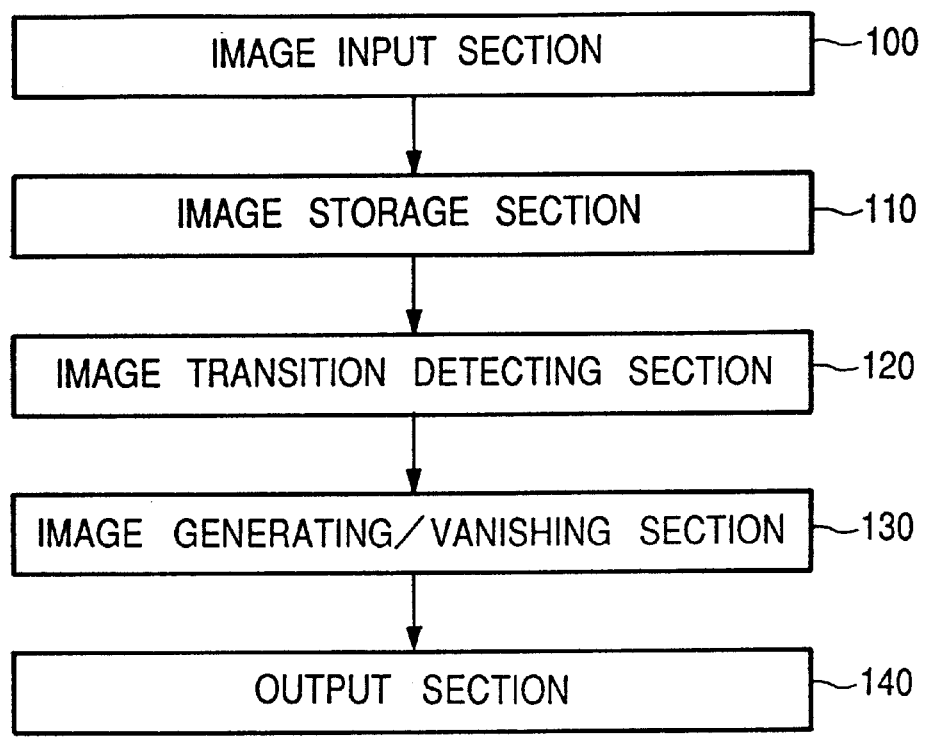
FIG. 1 is a block diagram showing a construction of the meteorological radar precipitation pattern prediction apparatus in embodiment 1 according to the present invention.

FIG. 1 is a block diagram showing a construction of the meteorological radar precipitation pattern prediction apparatus in the embodiment 1.

FIG. 1 shows image input section 100 for inputting radar images of a precipitation region, image storage section 110 for storing time-series past images, image transition detecting section 120 for detecting a change between images using an equation for evaluating an intensity change of the precipitation region according to the sum of differences between frames, image generating/vanishing section 130 for generating a (partial) image when the above intensity (values) increase; or for vanishing a (partial) image when the above intensity (values) decrease, and output section 140 for making and outputting a predicted image of the precipitation region according to a result output from the image generating/vanishing section 130.

The image generating/vanishing section 130 performs such locally-generating and vanishing operations for the precipitation pattern in the precipitation region, and simultaneously processes the intensities of the pattern. More specifically, convolution integral and inverse integral thereof between a Gaussian function (or the like) and image data of a precipitation region are iterated. At this calculation step, intensity information for maintaining the gray-levels of the image at a fixed level is supplied for each iteration.

Figure 2:
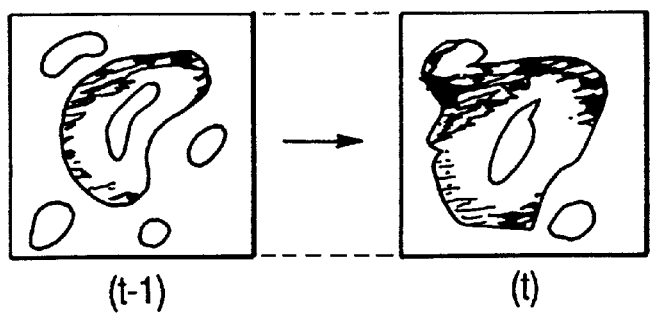
FIG. 2 is a typical illustration showing an example of growth and disappearance of precipitation regions observed in a real radar image.

FIG. 2 is a typical illustration showing an example of growth and disappearance of precipitation regions observed in a real radar image. This example shows that relatively small precipitation regions disappears while a relatively large precipitation region grows. However, these phenomena occur in accordance with characteristics based on the "sum" of changes of the gray levels when differences between frames are calculated, rather than changes of their areas.

Figure 3:
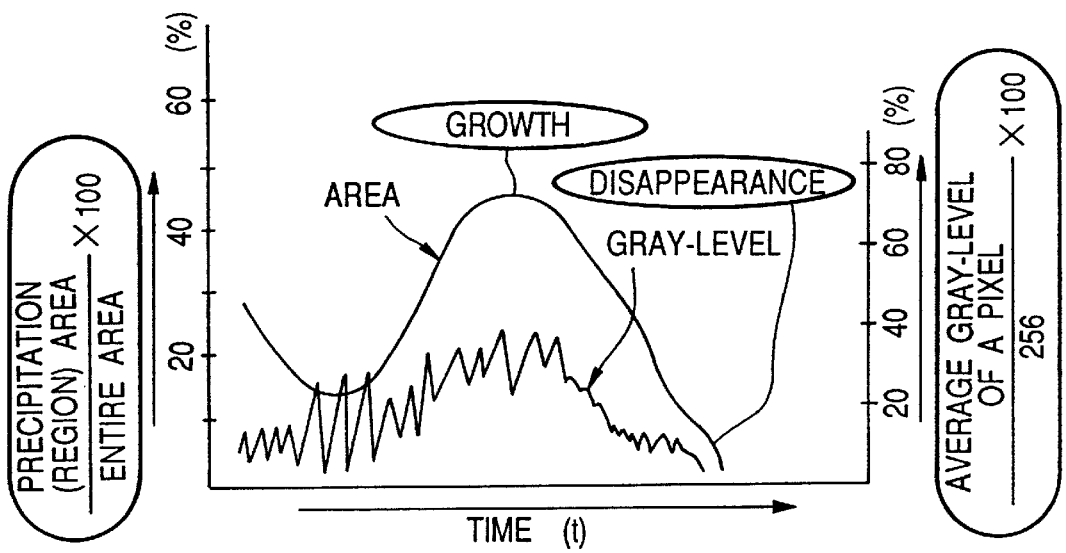
FIG. 3 shows example variations of the area and the gray-level(s) of a precipitation region with respect to a growing phase.

FIG. 3 shows example variations of the area and the gray-level(s) of a precipitation region with respect to a growing phase. According to the figure, even if the variation of the area does not show a tendency to increase according to the growth of the precipitation region, a sign of the growth (that is, a part showing an abrupt variation, which indicates aggravation of the convection) can be observed in the variation of the gray-level. Therefore, it may be appropriate that variation of the gray-level is used as a standard indicator for the generation or disappearance of a precipitation region.

Figure 4:
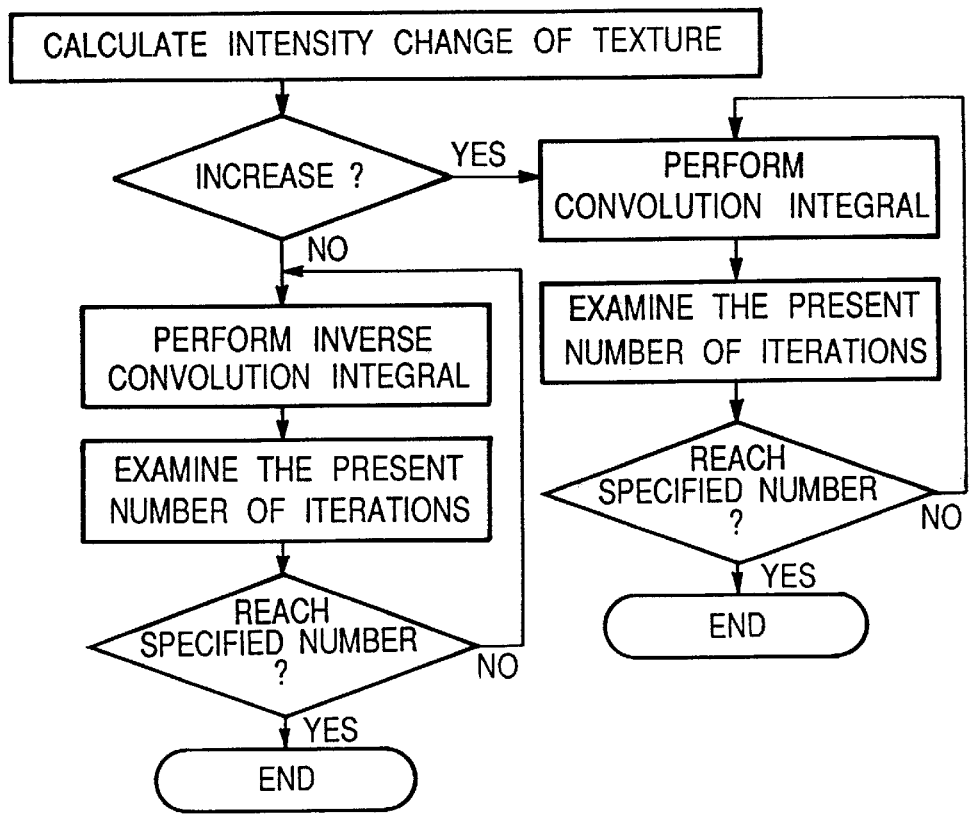
FIG. 4 is a flowchart for indicating the standard for selecting convolution integral and inverse integral thereof in embodiment 1.

FIG. 4 is a flowchart for indicating the standard for selecting convolution integral and inverse integral thereof in the present embodiment, that is, a flowchart for explaining operations of switching generating and vanishing processes according to the intensity change of the precipitation region. The gray-level change, that is, the intensity change can be defined as equation (1).

$$\text{(Degree of intensity level change)} \ \Delta r_{i,j} = \sum_{i,j \in W} \|Img[t][i][j] - Img[t-1][i][j]\| \tag{1}$$

- $W$: the entire frame;
- $t$: time
- $Img$: gray-level of the image
- $i, j$: address of each pixel
- $\|\cdot\|$: norm Here, the (time-series) variation of a texture pattern formed by the gray-levels is evaluated by calculating a difference between corresponding pixels between two frames and then calculating the sum of the differences.

Equation (2) shows convolution integral and inverse integral thereof.

Convolution operations:

$$D(x, y) = \int\int f(x', y') \circledast h(x - x', y - y') dx' dy' \tag{2}$$

$$\downarrow FFT$$

$$\tilde{D}(x, y) = F \times H \begin{cases} F: \text{Fourier transform of image} \\ H: \text{Fourier transform of Gaussian function} \end{cases}$$

$$\downarrow \begin{array}{l} IFFT \\ (\text{Inverse } FFT) \end{array}$$

$$D(x, y)$$

$$h(x, y, S, \sigma) = \frac{S}{\sqrt{2\pi}\, \sigma} \exp\left(-\frac{x^2 + y^2}{2\sigma^2}\right)$$

$$\begin{cases} x, y: & \text{PIXEL ADDRESS} \\ S: & \text{INTENSITY (VALUE)} \\ \sigma: & \text{VARIANCE} \end{cases}$$

The Gaussian function for performing the convolution operations with an image has two parameters such as a variance for controlling the spread of (the shape of) the function and the value of the function. At the operations, the FFT is separately performed for the image and the Gaussian function, then both results are multiplied together, and then the IFFT of the product is calculated. These operations improve the processing speed of the system.

Figure 5:
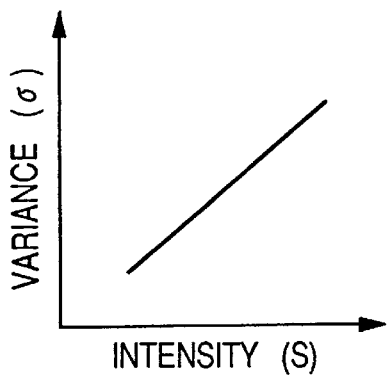
FIG. 5 shows a relationship between the intensity (S) of an image, which is previously calculated, and the variance (σ) of the Gaussian function.

FIG. 5 shows a relationship between the intensity (S) of an image, which is previously calculated, and the variance ($\sigma$), the parameter indicating the degree of the spread of the Gaussian function. The amount of the variance changes according to the number of iterations of the operations, but exists within 1.0–2.0 at the most.

Figure 6:
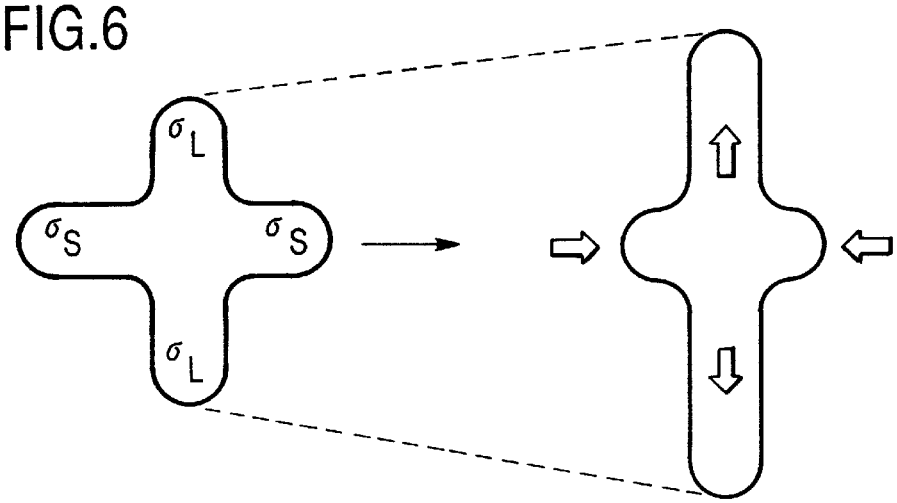
FIG. 6 shows an example of growth and disappearance of an unsettled object, observed in embodiment 1.

FIG. 6 shows an example of growth and disappearance of an unsettled object, observed in the present embodiment. In this example, the object in the image is transformed by the developing and vanishing operations according to the amount of the variance ($\sigma$) ("L" indicates a large variance, while "S" indicates a small variance). That is, the object having four projections shown in the figure is transformed into a slender object as a whole by performing the above operations. In practice, the generating/vanishing operations are acted on each local region in an image.

Accordingly, in this embodiment, by iterating convolution integral and inverse integral thereof as an image processing technique, it is possible to predict growth and disappearance of a precipitation region without using a physical equation such as a diffusion equation. In addition, the operations in this embodiment are based on an algorithm which scarcely includes complicated steps; thus, the system can be easily realized at a small cost.

Embodiment 2

In this embodiment, two-dimensional image information is converted into one-dimensional time-series signals relating to the area or the intensity of an image based on image processing techniques, so as to predict an average variation with respect to one-dimensional feature quantities. As the need arises, the two-dimensional image of each time may be divided into plural small blocks in order to follow a local transition of the two-dimensional image. By watching transition of a precipitation region as one-dimensional signals, memories and operational cost may be greatly decreased and very high-speed processing can also be realized.

Figure 7:
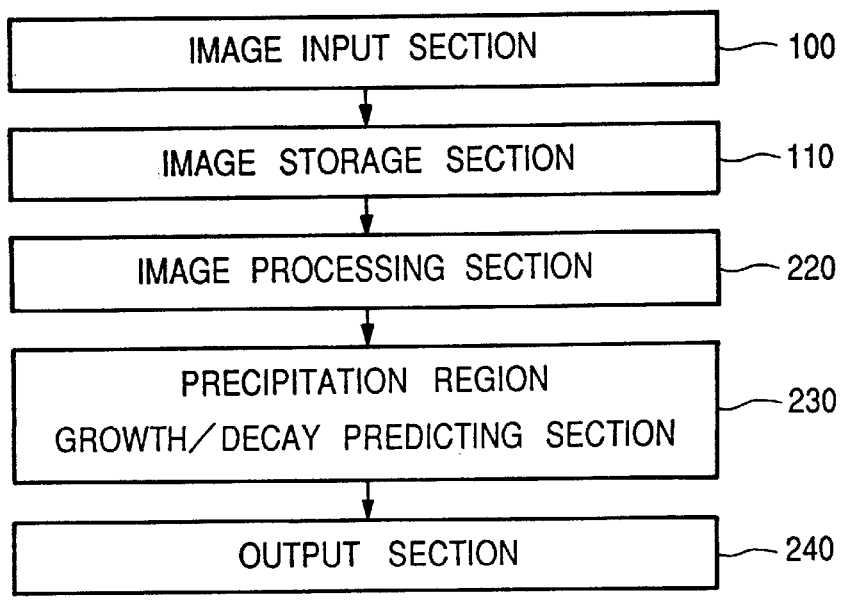
FIG. 7 is a block diagram showing a construction of the meteorological radar precipitation pattern prediction apparatus in embodiment 2 according to the present invention.

FIG. 7 is a block diagram showing a construction of the meteorological radar precipitation pattern prediction apparatus in the embodiment 2.

In the figure, image input section 100 and image storage section 110 are the same as those included in the apparatus of embodiment 1. The apparatus of the present embodiment further comprises image processing section 220 for one-dimensionally detecting changes of the area and the intensity of a precipitation region between two or more two-dimensional images stored in the image storage section 110, precipitation region growth/decay predicting section 230 for predicting changes such as growth or decay of a precipitation region according to the one-dimensional time-series signals (indicating the area and intensity transitions of the precipitation region) output from the image processing section 220, and output section 240 for making and outputting a predicted image of the precipitation region according to a result output from the section 230.

The image processing section 220 divides an image (i.e., a frame) into plural small blocks and detects area and intensity changes for each divided small block. Here, by detecting transition of the intensity (i.e., gray-level) together with transition of the area, more precise prediction can be performed. The image processing section 220 calculates and detects differences of the area and the intensity between each image and an image which is one or more frames apart from the above image, in turn (that is, time-series detection), and defines and outputs one-dimensional time-series signals. In this way, similar effects as using a moving average filter (an operator for processing input data using a moving average method and outputting the processed data) can be obtained. Specific detection methods will be explained later.

The precipitation region growth/decay predicting section 230 calculates cross-correlation values relating to the area and intensity changes using a cross-correlation function, and evaluates a time lag between both changes FIGS. 8A and 8B are typical illustrations showing changes between two frames of a precipitation region, which were observed in projected real radar echo images. FIG. 8A includes a typical illustration showing a changing process of a precipitation pattern and a graph diagram of the corresponding, edge-gradient (explained later), while FIG. 8B is a typical illustration showing changing processes of plural (local) precipitation patterns. In the figures, reference numerals 20 and 25 indicate precipitation patterns, reference numeral 21 indicates, a region having a small edge-gradient, and reference numeral 22 indicates a region having a large edge-gradient.

In the method for calculating the feature quantity of the edge-gradient performed in image processing section 220, a method of extracting edges using Sobel operators is used. In FIGS. 8A and 8B, grouping is performed such that regions having a large edge-gradient are shaded (refer to reference numeral 22) while other regions having a small edge-gradient are not shaded (refer to reference numeral 21).

According to such an image processing operation, a precipitation region is characterized by consisting of a central region with large precipitation and a peripheral region with small precipitation. Any precipitation pattern (20 or 25) has a double structure, and the profile as the edge-gradient of each pattern has always a mountain shape, as shown in the graph diagram of the edge-gradient in FIG. 8A. In the growing and decaying phases of a precipitation region, it is ascertained that "shaded" precipitation parts with large precipitation always change first and changes in other parts with small precipitation follow, and then the relevant precipitation region disperses. It is believed that this phenomenon originates in that the center of convection almost lies in a part with large precipitation and three-dimensional strength power of the convection appears like the above phenomena in the two-dimensional image. Accordingly, it is suggested that increase or decrease of the area can be predicted while following transition of strength power of the precipitation region.

FIGS. 9(A)–9(C) indicate transitions of area, intensity, and normalized cross-correlation value between the area and intensity, respectively. In order to extract a part having gray-levels more than a specified level from a two-dimensional image, the image processing section 220 compares the image with an appropriate threshold value. The section then counts the number of pixels included in the extracted part, the number being defined as the area of the precipitation region in one frame. The change of the intensity is defined as the following equation (3).

$$Tex\_I(t, s) = |TI(t) - TI(t - s)|\delta t, \text{ where} \quad (3)$$

$$TI(t, s) = \frac{1}{N_t} \sum_{i \in R} \sum_{j \in R} I_{i,j}^t - \frac{1}{N_{t-s}} \sum_{i \in R} \sum_{j \in R} I_{i,j}^{t-s}$$

In the above equation, $I_{i,j}^t$ indicates a gray-level of (i,j)th pixel in the nth frame. Tex_I(t,s) indicates the first derivative (i.e., a differential value of the first order) with respect to the above one-dimensional time-series signals. Here, relevant data include minutely oscillating components. If a difference between two (adjacent) frames is simply calculated, transition between frames is not appropriately detected under the influence of such minute variation. Therefore, the difference is calculated between signal values of a frame and another frame of s frames earlier. This follows a result of the operation using a moving average filter.

Next, in order to examine a statistical relationship between the area and intensity, a relationship via a cross-correlation function was examined (refer to FIG. 9(C). As a result, the normalized cross-correlation value is 0.7 at the smallest, and the positions of maximum values of the area and intensity are approximately 30 minutes to 1 or 2 hours (in the time scale) apart from each other. In consideration of the relationship between the transitions of two-dimensional distribution of the intensity and the overall area (as shown in FIGS. 8A and 8B) together, it can be concluded that there is a time delay of 30 minutes to 1 or 2 hours between them and there also exists periodic repeatability. Accordingly, it can be predicted that the area increases 30 minutes to 2 hours later after the accumulated value of the intensity exceeds a fixed value.

In order to predict a further future situation more than 1 or 2 hours ahead, regarding relatively moderate area transition, it is possible, to some degree, to use a polynomial of about from third to sixth order or an appropriate non-linear approximate equation. The increasing/decreasing changes of the area can be predicted, as shown in FIG. 10 (observed values are sown in part (A) while predicted values by approximation are shown in part (B)), by iterating extrapolation with fitting a quadratic function step by step. That is, even though the area decreases at a time, re-increase of the area can be predicted if the accumulated intensity value within 30 minutes to 2 hours is more than a fixed value. Such area increase indicates that the relevant precipitation region becomes active and spreads with the activity of convection.

Regarding transition of the area, FIGS. 11(A)–11(C) show results of detection and prediction according to the following method.

As shown in equation (4), in order to appropriately detect one-dimensionally represented area transition, difference between area S(t−s) of s frames earlier and present area S(t) is calculated so as to judge the positive/negative state of the difference. Similar to the intensity case, the area data include minute (oscillatory) valuation (see FIG. 11(A)). Therefore, it is necessary to detect differences between the present data and data not immediately before the present, but several frames earlier.

$$S(t) - S(t-s) \begin{cases} > 0 & \text{(increment)} \\ = 0 & \text{(no change)} \\ < 0 & \text{(decrement)} \end{cases} \quad (4)$$

As a result of the decision of the increase/decrease of the area according to equation (4), it can be concluded that actual increase (+) and decrease (−) (refer to FIG. 11(A)) were not always detected before and after the area reaches a maximum value but could be detected almost all the time (refer to FIG. 11(B)). Additionally, equation (5) is used to perform prediction based on the intensity transition, which precedes the area transition (in FIG. 11, predicted results corresponding to data shown in part (A) is shown in part (C)).

$$E(t, k, s) = \sum_{k=0}^{5} Tex\_I(t-k, s-k) > \text{Threshold value} \quad (5)$$

Equation (5) has a form in which five past intensity values are added. This is because in the distribution of intensity values, maximum and minimum values greatly change per unit time in comparison with monotonous changes of the area, thus the increase/decrease of the area is judged by assigning a threshold value to the whole energy.

FIG. 12 is a graph diagram for indicating a hitting ratio of the area-increase/decrease prediction based on the intensity transition (as shown in FIG. 11). Average and variance relating to the increase/decrease are shown, which have characteristics that the "increase" has a little higher hitting ratio and the variances have a narrow range of ±10%.

Consequently, in the present embodiment, the transition of a precipitation region is predicted by converting two-dimensional image information into one-dimensional time-series signals with respect to the area and the intensity; thus, high speed prediction can be performed with less memory size. The present method also uses a knowledge of statistically-defined time-delay which originates in convective phenomena; thus, the method can realize a prediction accuracy higher than that realized by the conventional methods which do not use the features of such phenomena.

Embodiment 3

In this embodiment, a physical equation and image processing methods are combined so as to automatically perform the prediction of a precipitation region based on an advection-diffusion equation system (abbreviated to an "advection-diffusion equation" for convenience although the equation includes terms relating to physical effects other than advection and diffusion, as mentioned below), wherein radar echo image information items themselves are supplied as variables in the advection/diffusion equation. Then, values of the terms of the equation which represent various physical effects such as time, advection, diffusion, source, sink, and dispersion, and diffusion coefficient(s) are also supplied in turn. This embodiment is characterized by these operations.

In other words, modeling of a precipitation pattern with a fluid-dynamic frame is performed so as to assume a fluid model comprising five fundamental fluid elements of advection, diffusion, source, sink, and dispersion.

The diffusion is an effect in which a precipitation pattern isotropically spreads so that the gray-levels are lowered.

The advection is an effect in which each part of a precipitation pattern (i.e., a fluid having gray-levels) is subjected to neighboring flows and travels anisotropically (for example, an upper part is swept away downstream).

The source is an effect in which the gray-levels locally increase, for which a model having the convection center in a region where the amount of precipitation of a precipitation pattern is highest (that is, a region has the highest gray-level) is used.

The sink effect can be regarded as occurring in a decaying region where convection gets weaker. That is, the amount of precipitation decreases; thus, this is an effect that gray-levels locally decreases in the precipitation pattern.

The dispersion is an effect that gray-levels are non-uniformly lowered, and this effect corresponds to the decaying phase.

FIG. 13 is a block diagram showing a construction of the meteorological radar precipitation pattern prediction apparatus in the embodiment 3.

In the figure, image input section 100 and image storage section 110 are the same as those included in the apparatus of embodiment 1 or 2. The apparatus of the present embodiment further comprises image processing section 320 for calculating image-feature quantities such as the amount of change of precipitation, distribution of edge-gradients, and the like, between two or more two-dimensional images; advection-diffusion equation calculating section 330 for calculating, with the above various image-feature quantities as initial values, spatial-temporal variations of the precipitation based on initial information about shape and gray-levels of the relevant precipitation region, by using an advection-diffusion equation which includes the above six terms; prediction section 340 for predicting a transition of the precipitation region according to a calculated result; and output section 350 for outputting predicted results in the form of time-series images.

The following are operations performed by the section 320.

(1) Dividing an image into regions of two types, a region having a high edge-gradient and a region having a low edge-gradient with respect to the gray-level.

(2) Supplying the gray-level of each pixel in each image as a variable of the above equation (detailed equation form will be explained later) and changing the diffusion coefficient(s) of the diffusion term according to a rate of change of the one-dimensionally represented area.

(3) Supplying data relating to positive and negative regions (which are determined when difference between two consecutive frames is calculate) to the source and sink terms of the equation, respectively.

(4) Extracting a change of the center of gravity in the region having the high edge-gradient (with respect to the gray-level) so as to determine and supply advection vectors. Here, if degree of the advection is strong, a change of the center of gravity in the region having the low edge-gradient is also extracted and corresponding advection vectors are supplied. Additionally, as explained in the embodiment 2, increase/decrease of the area may be predicted with the following changes of the intensity of the precipitation region.

FIG. 14 is a typical illustration showing states of extraction of a difference between two consecutive frames. In the figure, reference numeral 71 indicates a future region, reference numeral 72 indicates a past region which does not overlap a present region, and reference numeral 73 indicates a overlapping region of the past and the present, reference numeral 75 indicates a present region, and reference numeral 76 indicates a past region.

When a precipitation region moves from the left to the right side in FIG. 14 and a difference between the two regions (relating to the movement) is obtained (that is, the present minus the past), the future region 71 (positive), the past region 72 without overlap with a present region (negative), and overlapping region relating to both regions (zero) are obtained. As described later, gray-level information items relating to these regions are respectively supplied to the source and sink regions in the advection-diffusion equation.

As a partial differential equation for physically representing the above-described five fundamental fluid characteristics, an advection-diffusion equation dependent on time is known (refer to "*Progress of Fluid Mechanics/Turbulent Flow*" edited by I. Tani, Maruzen Co., Ltd.) That is, as shown in equation (6), a diffusion term (a form of the second derivative), an advection term (the product form of an advection vector and the first derivative of the gray-level), a source term, a sink term, and a dispersion term are provided from the first term of the right side.

$$\frac{\partial I(x, y, t)}{\partial t} = \lambda(x, y) \cdot \nabla^2 I(x, y, t) + (\vec{u}(x, y) \cdot \nabla) I(x, y, t) + \text{Source}(x, y, t) - \text{Sink}(x, y, t) - \varepsilon(x, y) \quad (6)$$

Here, variable I(x,y,t) in equation (6) means a gray-level of pixel (x,y) of a precipitation pattern at time t. The left side is a time term which represents a change of the gray-level for a minute time. Reference symbol u indicates a two-dimensional advection velocity vector which corresponds to a local moving velocity of the precipitation pattern. In equation (6), only the advection term is non-linear. Reference symbol $\lambda$ means a diffusion coefficient. In the above references "Y Yuuma, et al., '*Experiments for a Very-short-range Prediction of Snowfall Using a Simple Weather Radar System Part 2.* —Examples of Actual Prediction—'..." and "'*Progress of Fluid Mechanics/Turbulent Flow*' edited by I. Tani...", the diffusion coefficient is defined as a constant over the overall region. In contrast, the present embodiment has a feature that discrete diffusion coefficients are assigned to each pixel.

The equation (6) can be transformed into discrete-form equation (7) by using difference calculus (or calculus of finite difference). The approximation is performed in a manner such that the time term is represented by forward difference, the term of the first derivative is represented by central difference, and the term of the second derivative is reduced to the first-order term with respect to distance.

$$I_{i,j}^{n+1} = I_{i,j}^{n} + \quad (7)$$
$$\delta t \cdot (\lambda_{i,j} \cdot \nabla^2 I_{i,j}^n - u_{i,j}^n \cdot \nabla I_{i,j}^n - v_{i,j}^n \cdot \nabla I_{i,j}^n + \text{Source}_{i,j}^n + \text{Sink}_{i,j}^n - \varepsilon_{i,j}^n)$$

where n=0,1,2 ... N, (i,J) $\in R^2$ $R^2$ indicates a rader image region $$\frac{\partial I}{\partial t} \approx \frac{I^{n+1} - I^n}{\delta t}$$

$$\nabla I \equiv \left(\frac{\partial}{\partial x} + \frac{\partial}{\partial y}\right) I \approx \frac{I_{i+1,j} - I_{i-1,j}}{2h} + \frac{I_{i,j+1} - I_{i,j-1}}{2h}$$

$$\nabla^2 I \equiv \left(\frac{\partial^2}{\partial x^2} + \frac{\partial^2}{\partial y^2}\right) I \approx \frac{I_{i+1,j} + I_{i-1,j} + I_{i,j+1} + I_{i,j-1} - 4 I_{i,j}}{h^2}$$

$$\text{Diffusion}_{i,j}^n \equiv \nabla^2 I_{i,j}^n \approx I_{i+1,j}^n + I_{i-1,j}^n + I_{i,j+1}^n + I_{i,j-1}^n - 4 \cdot I_{i,j}^n$$

$$\text{Advection1}_{i,j}^n \equiv \nabla I_{i,j}^n \approx (I_{i+1,j}^n - I_{i-1,j}^n)/2$$

$$\text{Advection2}_{i,j}^n \equiv \nabla I_{i,j}^n \approx (I_{i,j+1}^n - I_{i,j-1}^n)/2$$

When the image region and the time axis are divided ihl a grid with equal spacing, coordinate values and time are represented as follows: x=i·h, y=j·h, t=$\delta$t·n, where i,j,n are integrals, h is a decimal, and equation (7) is thus simultaneous linear equations with respect to a two-dimensional image region. In addition, the predicted image of a precipitation pattern is obtained such that after future precipitation pattern ($I_{i,j}^{n+1}$) one step ahead of a time is defined based on precipitation pattern ($I_{i,j}^n$) at the time, calculation for updating $I_{i,j}^{n+1}$ and $I_{i,j}^n$ is iterated a necessary number of times.

The predicted image is an output result of equation (7) itself. Here, to solve equation (7), the relaxation method using the Gauss-Seidel method is used; more specifically, the explicit method for avoiding the calculation of a high-order inverse matrix is used.

FIGS. 15A and 15B are a typical illustration showing a divided (i.e., discrete) state of an image and assignment of boundary conditions necessary for solving the equation. In the figure, symbol "$\Delta$" indicates a point inside a precipitation region in the image, while symbol "○" indicates a point outside the precipitation region. The precipitation region corresponds to a part of the actual phenomena; thus, in order to perform calculation with respect to cut-out parts of real consecutive planes, the lattice for calculation is determined such that a condition of continuity is given for the internal and external points, that is, the outermost lattice point in the image and the (next) inner lattice point have the same set of values with respect to equation (7). This is because, as shown in equation (7), as terms of the first and second derivatives are transformed into discrete form, lattice points ±1 apart from reference point (i,j) (i.e., before and after the reference point) become referred to. Regarding the condition of continuity, as often used in numerical dynamics in calculation, the most outer points in the calculation lattice (○) and the (next) inner lattice points ($\Delta$) (with respect to the most outer points) are simply combined using an equality and the equality is referred to for each time-integral.

Additionally, the initial conditions (or initial data) are classified into: (i) gray-levels of a frame of the real two-dimensional precipitation pattern at the beginning of the prediction ($I_{i,j}^0$), (ii) advection vectors ($\bar{u}(i,j)$) and diffusion coefficients ($\lambda_{i,j}$), and (iii) source ($\text{Source}_{i,j}^0$), sink ($\text{Sink}_{i,j}^0$), and dispersion ($\varepsilon_{i,j}^0$).

Here, precipitation-pattern images necessary for determining values of the initial data are previously stored in the image storage section 110.

Methods for determining the initial condition belonging to the above item (ii) will be explained later. Here, the diffusion coefficients are previously adjusted on the assumption that they have a proportional relationship with degree of the area transition.

Hereinbelow, the initial conditions relating to the above item (iii) will be explained.

The term Source(x,y,t) is set to be a fixed gray-level (value) with respect to a region having the maximum precipitation (i.e., having high gray-levels) in the precipitation pattern, that is, a region which was recognized as a "source".

$$Source_{i,j}^0 = \left(\hat{I}_i^0 + n \cdot gx, j + n \cdot gy\right) \quad (8)$$

where moving velocity of center of gravity of central part of convection: (gx, gy)

In the meantime, in the sink region represented by Sink (x,y,t), gray-level distribution shifts from high to low level; thus it is difficult to clearly specify the center part of convention. To explain this using a feature of images, it is estimated that in the sink region, edge (i.e., first derivative) structure is becoming unclear as the gray-levels of the precipitation pattern falls. Therefore, as shown by equation (9), a fixed negative (gray-level) value is supplied to the sink term after gray-level $I_{i,j}$ and gradient $\nabla I_{i,j}$ are compared with respect to the present (n=0) and the past (by s frames), and a region where both items were decreased is specified. Here, the gradient itself is proportional to the gray-level.

$$Sink_{i,j}^0 = \hat{I}_{i,j}^0 : \quad (i, j) \in \{(I_{i,j}^{0-s} > I_{i,j}^0) \cap (\nabla I_{i,j}^{0-s} > \nabla I_{i,j}^0)\} \quad (9)$$

where subscript s is used for indicating an s frames-past real precipitation pattern image with the reference frame number n=0 at the beginning of prediction.

Next, ε(x,y) is the dispersion term to which, as shovwn in equation (10), a random negative value is supplied to each point (rx,ry) with regarding neighboring point (i+rx,j+ry) to the sink region defined by equation (9) as a dispersing region.

$$\varepsilon_{i+rx,j+ry}^0 = \hat{I}_{i+rx,j+ry}^0 : \quad (10)$$
$$(i, j) \in \{(I_{i,j}^{0-s} > I_{i,j}^0) \cap (\nabla I_{i,j}^{0-s} > \nabla I_{i,j}^0)\}$$

If a non-linear effect is included in a predicted precipitation pattern, both advection velocities and gray-levels in the advection term may be changed. Here, changes of the advection velocities should be predicted using a form other than equation (7), as described later. In contrast, if only linear effects are considered, the advection velocities are set to be constant.

The following are explanations relating to the advection velocity.

Figure 16:
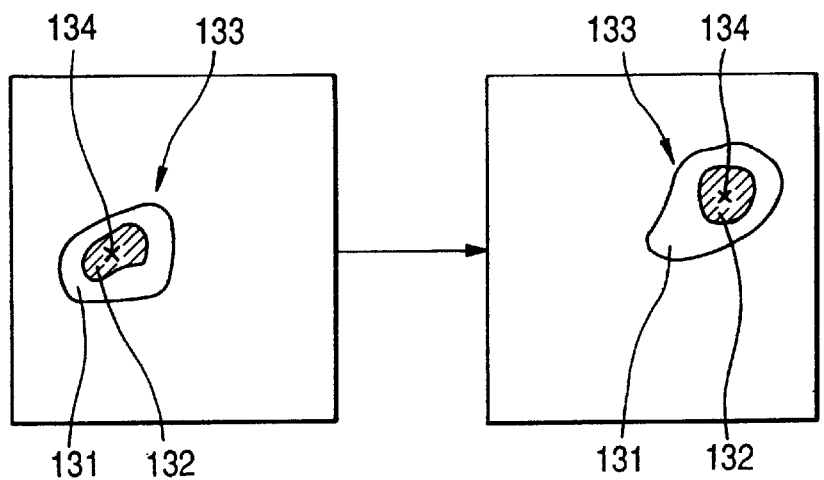
FIG. 16 is a typical illustration showing a result by following transition of the center of gravity of a precipitation region via image processing.

FIG. 16 is a typical illustration showing a result by following transition of the center of gravity of a precipitation region via image processing. In the figure, reference numeral 131 indicates a region with a small edge-gradient, reference numeral 132 indicates a region with a large edge-gradient, reference numeral 133 indicates a precipitation pattern, and reference numeral 134 indicates the center of gravity.

The result of the follow-up of the center of gravity is provided to the advection vector $(u_{i,j}^n, v_{i,j}^n)$ in equation (7).

The edge-gradients are acquired from the precipitation region image, and in the region with a high edge-gradient, transition of the center of gravity (134) for each unit time is followed. Here, if strong advection is generated, transition of the center of gravity in the region with a low edge-gradient is also detected to determine the advection vectors. The direction and amount of displacement of the center of gravity is assumed as average advection components generated in the precipitation region. If more local advection components are required, a velocity vector obtained as a solution of the Navier-Stokes equation is provided for each lattice point.

Figure 17A:
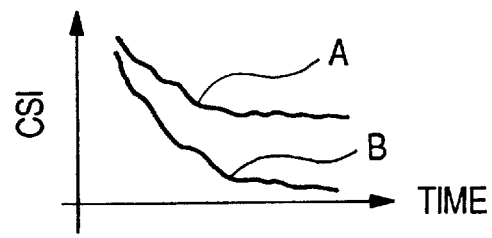
FIGS. 17A–17C are graph diagrams for comparing predicted results of embodiment 3 and the conventional methods.
Figure 17B:
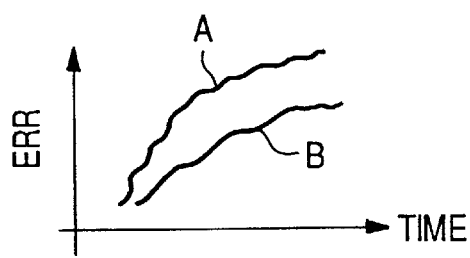
Figure 17C:
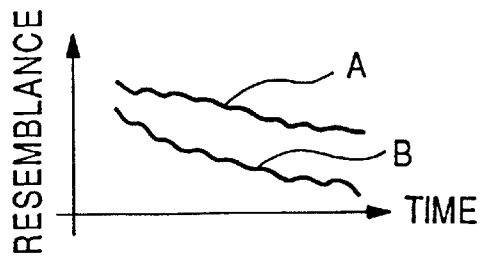

FIGS. 17A–17C are graph diagrams for comparing predicted results of the present embodiment and the conventional methods. In each figure, line A shows a result according to the method of the present embodiment while line B shows a result of the conventional method such as the CC method or a method using a neural network model. If the CSI (Critical Success Index), which is generally known as a hitting ratio with respect to the area, is used (see FIG. 17A), it can be recognized that the fall of the hitting ratio is much suppressed in the case of the present embodiment than the case of the conventional method. Here, with a as the area of the real observed region, b as the area of the predicted region, and c as the area of the "hit" region, the following is the CSI.

$$CSI=b/(a+c) \, (\%)$$

Next, if the following "prediction error ERR" with respect to predicted values for the gray-level, that is, the amount of precipitation, is used, it can also be recognized that the present embodiment has much higher accuracy. The EER indicates a ratio of the sum of the real (amount of) precipitation to the sum of the predicted precipitation. Here, the precipitation is acquired by converting the gray-levels based on a radar characteristic function (i.e., an exponential function). When both sums of the gray-levels of the real and predicted precipitation patterns agree with each other, the ERR becomes 100% (see the following equation (11)).

$$Err(\%) = \begin{cases} \dfrac{\left|\sum_{i \in R}\sum_{j \in R} real_{i,j} - \sum_{i \in R}\sum_{j \in R} predicted_{i,j}\right|}{\sum_{i \in R}\sum_{j \in R} real_{i,j}} \times 100 & (\text{real} \neq \text{predict}) \\ 100 & (\text{real} \equiv \text{predict}) \end{cases} \quad (11)$$

where $R \equiv$ existing pixel number

Furthermore, regarding resemblance of the shape (see FIG. 17C), it can also be recognized that in the method of the present embodiment, transition of the shape for each unit time is much suitably defined in accordance with attributes of the relevant equation.

According to the above results of performance estimation, it can be judged that the prediction of the present embodiment has considerably high accuracy. Additionally, in the case of a stationary precipitation region, a hitting ratio suitable for practical use can be achieved even in the prediction of 5 or 6 hours ahead (conventional limit is 2 or 3 hours ahead).

That is, in the present embodiment, the time-dependent physical equation and the image processing methods are appropriately combined; every term with respect to the effects indicating various phenomena relating to the precipitation is approximated by using a single equation; and the prediction is performed by providing initial shape and gray-level data of the relevant precipitation region. Therefore, prediction closer to the actual phenomena (that is, with higher accuracy) of the shape, gray-levels, etc., of the precipitation region can be performed without relying on empirical rules.

Embodiment 4

In this embodiment, one-dimensional time-series signals with respect to the area transition are extracted from two-dimensional image information based on image processing techniques, and a non-linear function is fit to the extracted data using the least square method, whereby an area-transition state of dozens of frames ahead is predicted.

As described in the second embodiment, by representing changes of a precipitation region using one-dimensional signals, the size of memories and the operation cost can be greatly reduced, and very high-speed processing can also be realized.

Figure 18:
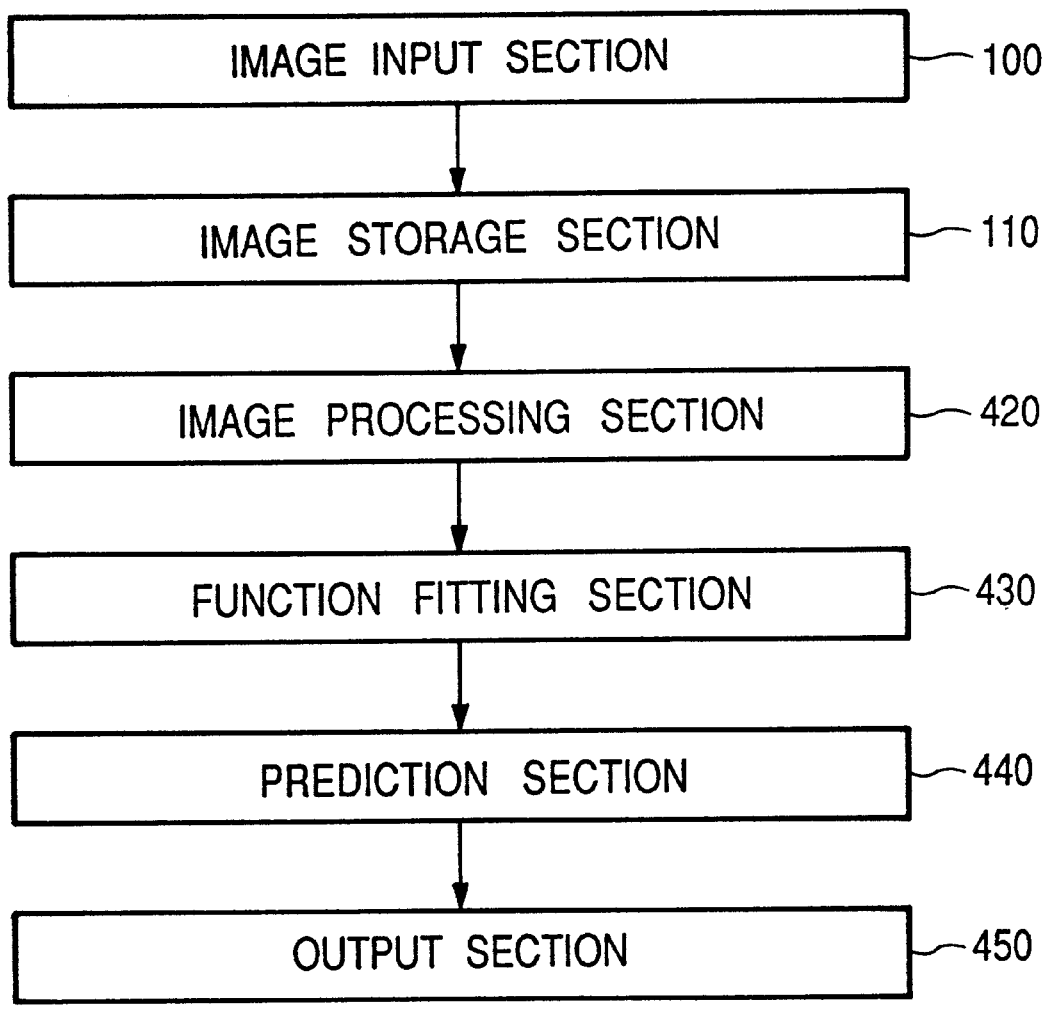
FIG. 18 is a block diagram showing a construction of the meteorological radar precipitation pattern prediction apparatus in embodiment 4 according to the present invention.

FIG. 18 is a block diagram showing a construction of the meteorological radar precipitation pattern prediction apparatus in the embodiment 4.

In the figure, image input section 100 and image storage section 110 are the same as those included in the apparatus as shown in embodiments 1–3. The apparatus of the present embodiment further comprises image processing section 420 for extracting changes of the area (value) as one-dimensional time-series signals, with respect to the past time-series (two-dimensional) images stored in the image storage section 110; function fitting section 430 for fitting a non-linear quadratic function into the one-dimensional time-series signals via the least square method; prediction section 440 for predicting an area-transition state of dozens of frames ahead based on a result output from the prediction section 440; and output section 450 for making and outputting a predicted image of the precipitation region according to a result predicted by the prediction section 440.

The prediction section 440 predicts "a maximum value at each switching point from increase to decrease" and (or) "a minimum value at each switching point from decrease to increase".

Figure 19:
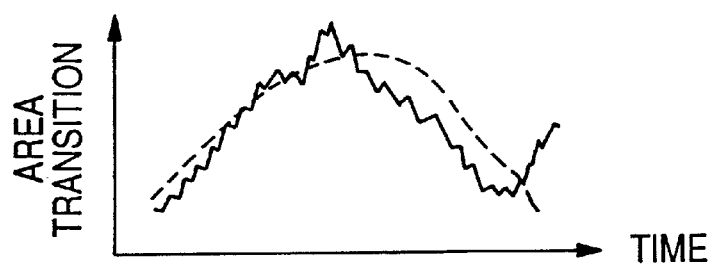
FIG. 19 shows results of approximate fitting of an non-linear function into an actual transition of the area using the least square method.

FIG. 19 shows results of approximate fitting of an non-linear function into an actual transition of the area using the least square method, that is, results by fitting the function indicated by a broken line into observed values indicated by a solid line. When the area transition of a precipitation region is detected is one-dimensional time-series signals from two-dimensional images, a general characteristic of any precipitation pattern can be found in which maximum and minimum values alternately appear for every several hours in a sine-wave-like pattern. Therefore, these maximum and minimum values can be predicted by fitting an appropriate non-linear function.

Figure 20A:
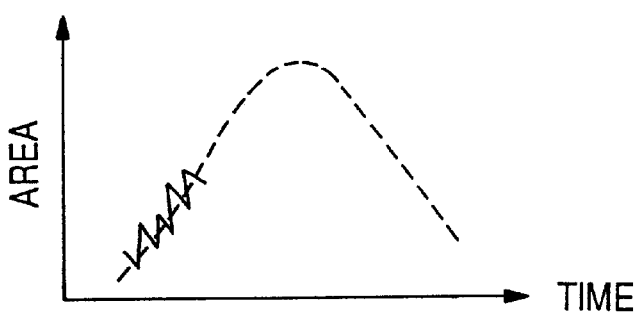
FIGS. 20A–20C show results of fitting of a non-linear function with respect to accumulated past data.
Figure 20B:
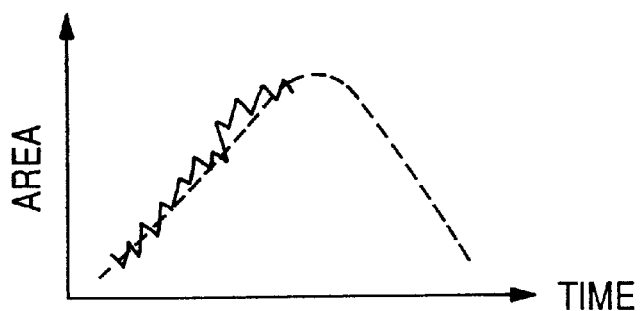
Figure 20C:
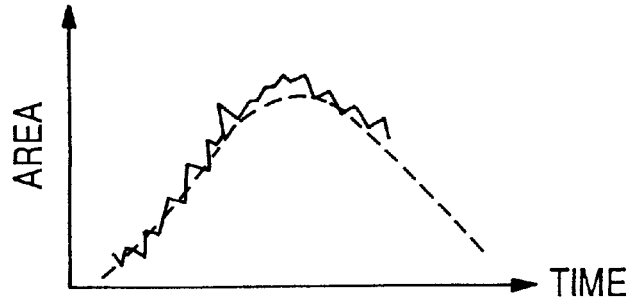

FIGS. 20A–20C show results of fitting of a non-linear junction with respect to accumulated past data.

When a quadratic function is fit using the least square method into an initial growing phase of a precipitation region, a maximum value, that is, a switching time from growth to decay and the maximum area can be predicted (see FIG. 20A). If more past data are referred to, the evaluation accuracy of the maximum value is improved (see FIG. 20B). In addition, it can be observed that there is no remarkable difference between the true maximum value (refer to FIG. 20C) and the result predicted by approximately fitting the non-linear function. This result corresponds to a fact that changes in the growing and decaying phases show a quadratic function-like transition and after a maximum value appears, the next maximum value will generally not appear for dozens of hours later.

Figure 21A:
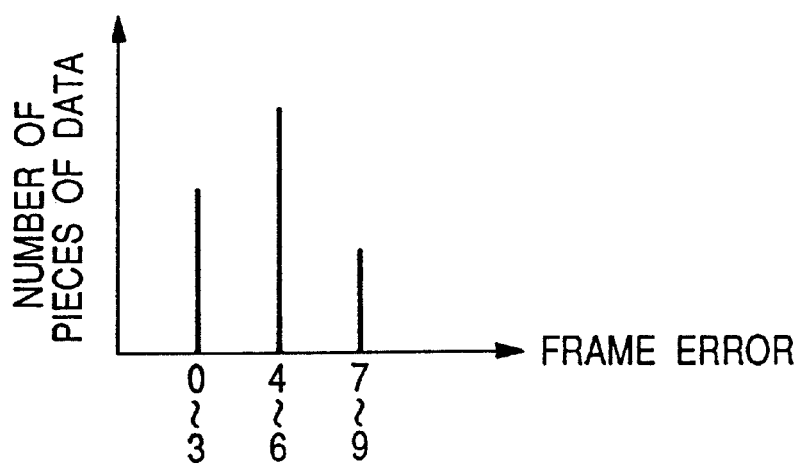
FIGS. 21A and 21B show statistic estimation for the prediction using a non-linear function.
Figure 21B:
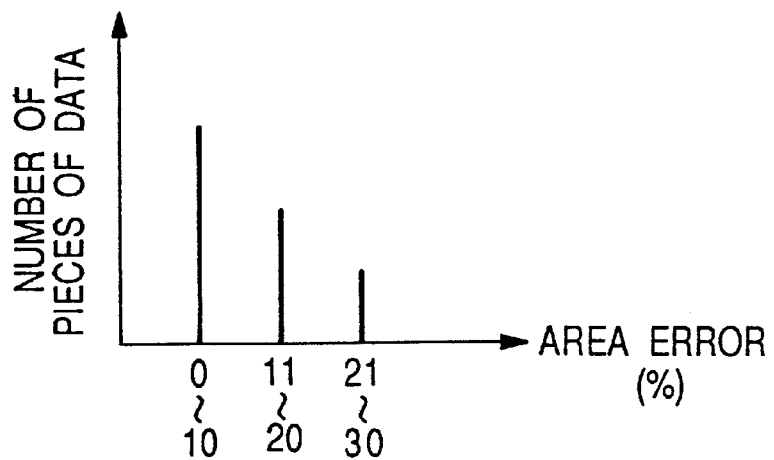

Next, FIGS. 21A and 21B show statistic estimation for the prediction using a non-linear function.

When the "frame error" between the actual and predicted images is statistically analyzed into three classes, the error of 4–6 frames is the most frequent case (see FIG. 21A) and this corresponds to an error of 20–30 minutes in time scale. On the other hand, the area itself has approximately a 10% error (see FIG. 21B). Accordingly, it can be stated that the area prediction using the non-linear function achieves an accuracy generally suitable for practical use.

Figure 22:
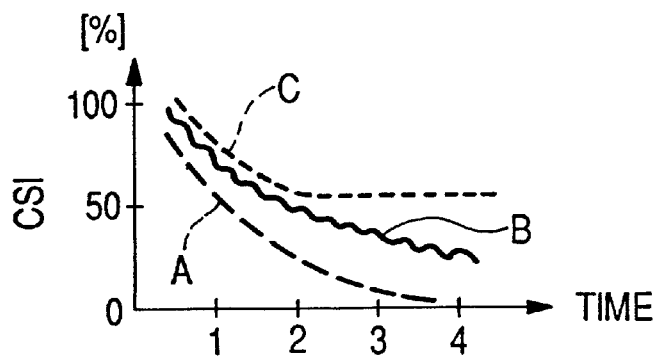
FIG. 22 shows a result by comparing a hitting ratio of the method according to embodiment 4 with that of a conventional method by using the CSI.

FIG. 22 shows a result by comparing a hitting ratio of the method according to the present embodiment with that of a conventional method.

In the case of the CC or neural network method as a conventional method (see line A in the figure), the hitting ratio after 1 hour is less than 50%. If growth of the precipitation region is also considered by using a fluid equation in the method, the hitting ratio becomes less than 50% after 2 hours or more elapse (see line B in the figure). However, after 2 hours, the phase has shifted from the growth to the decay, in practice, and in such a case, the diffusion coefficient should essentially be varied. Until now, an adaptive algorithm suitable for such a variation has not been proposed. That is, in the conventional techniques, either increase or decrease of the area can be predicted.

In the present embodiment, the change from the growth to the decay can be predicted based on one-dimensional signals relating to the area, and the diffusion coefficient in the fluid equation can be previously set (or changed) in accordance with the relevant growing or decaying phase. In this way, a remarkable decrease of the hitting ratio can be prevented even after 2 hours (see line C in FIG. 22), whereby a hitting ratio more than 50% can be maintained for a long time.

An exponential function, sine function, or the like may be used other than the quadratic function, but it is experimentally known that the quadratic function is most desirable. In addition, if a higher-order function (of the third order or more) is fit using the least square method, there occurs a problem in that plural inappropriate extreme values appear in most cases.

As explained above, in the present embodiment, two-dimensional image information is converted into one-dimensional time-series signals relating to the area so as to predict transition of a precipitation region. Therefore, high-speed processing can be realized with less memory size, and prediction of "large-size" phenomena relating to the area, such as a shifting phase from growth to decay or from decay to growth, can be predicted by approximately fitting a non-linear function to transition (data) of the area using the least square method. Consequently, prediction which maintains an accuracy suitable for practical use for a long time can be realized.

Embodiment 5

In this embodiment, data relating to a precipitation region in frames of different times are input; a contour of the past precipitation region is defined based on the input data; normals (i.e., normal lines) sparsely set with respect to the contour are extended with respect to the inside and outside of the contour; an intersection of each extended normal and a line surrounding the precipitation region in the present frame is acquired; and velocity vectors are evaluated based on displacement of the contour. In this way, local moving velocities of the precipitation region are evaluated. Next, in order to adjust the velocity vectors throughout the whole region, the obtained local velocity vectors are substituted as initial values for the relevant term in a fluid equation. In addition, the fluid equation includes non-stationary expressions, thus, the equation is integrated with respect to time and each result is stored repeatedly, whereby evaluation of velocity vectors which closely distribute can be performed.

Furthermore, the transition state of the next time with respect to the gray-level distribution is detected by substituting the calculated velocity vectors into the advection (velocity) term in the advection-diffusion equation and further by substituting shape and gray-level information data of the precipitation region into the diffusion, advection, source, sink, and dispersion terms to perform the integral with respect to time. By iterating the time-based integral, a predicted result of the gray-level transition can be obtained and thus the precipitation region can be moved based on the advection vector defined for each pixel.

Figure 23:
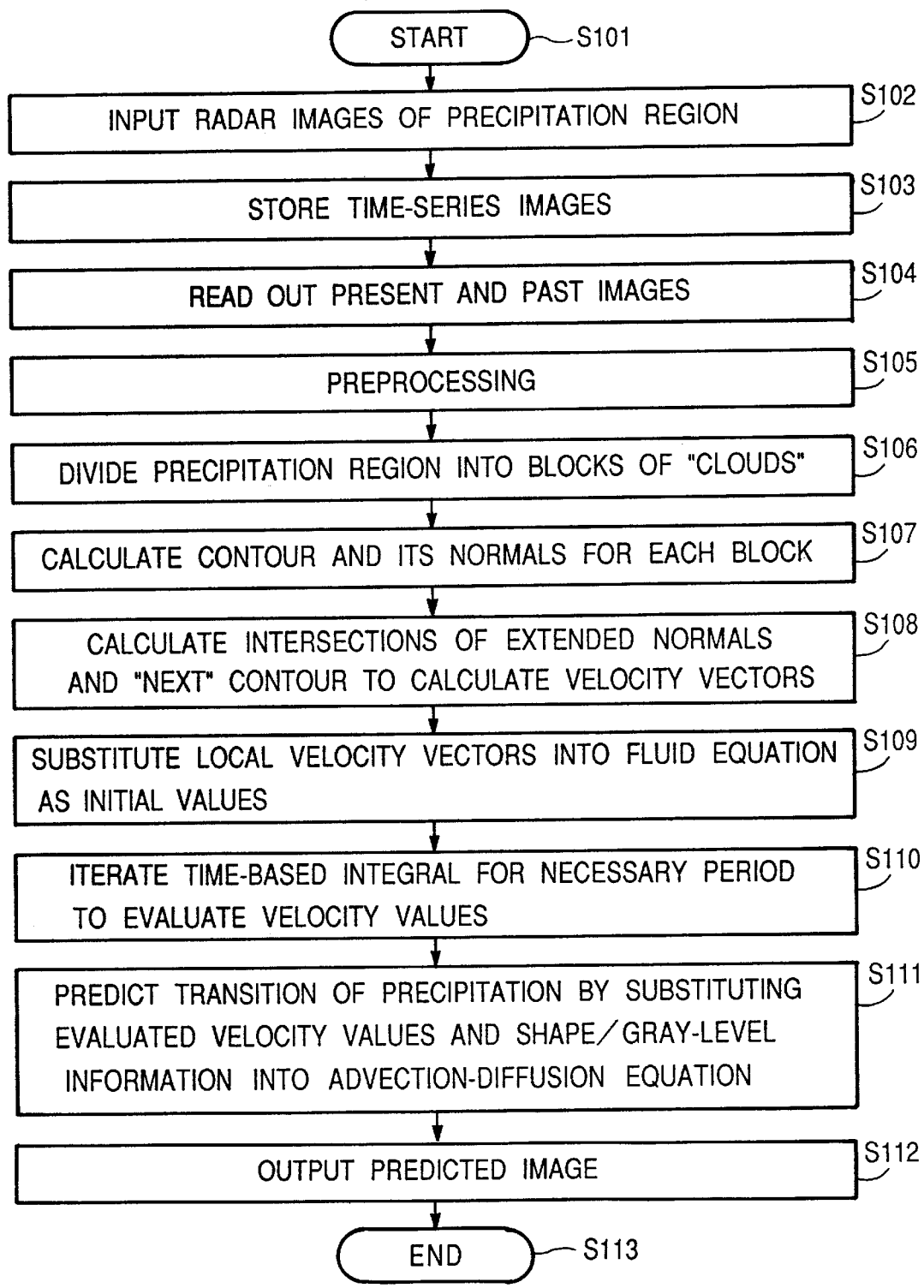
FIG. 23 is a flowchart of the meteorological radar precipitation pattern prediction method of embodiment 5 according to the present invention.
Figure 24:
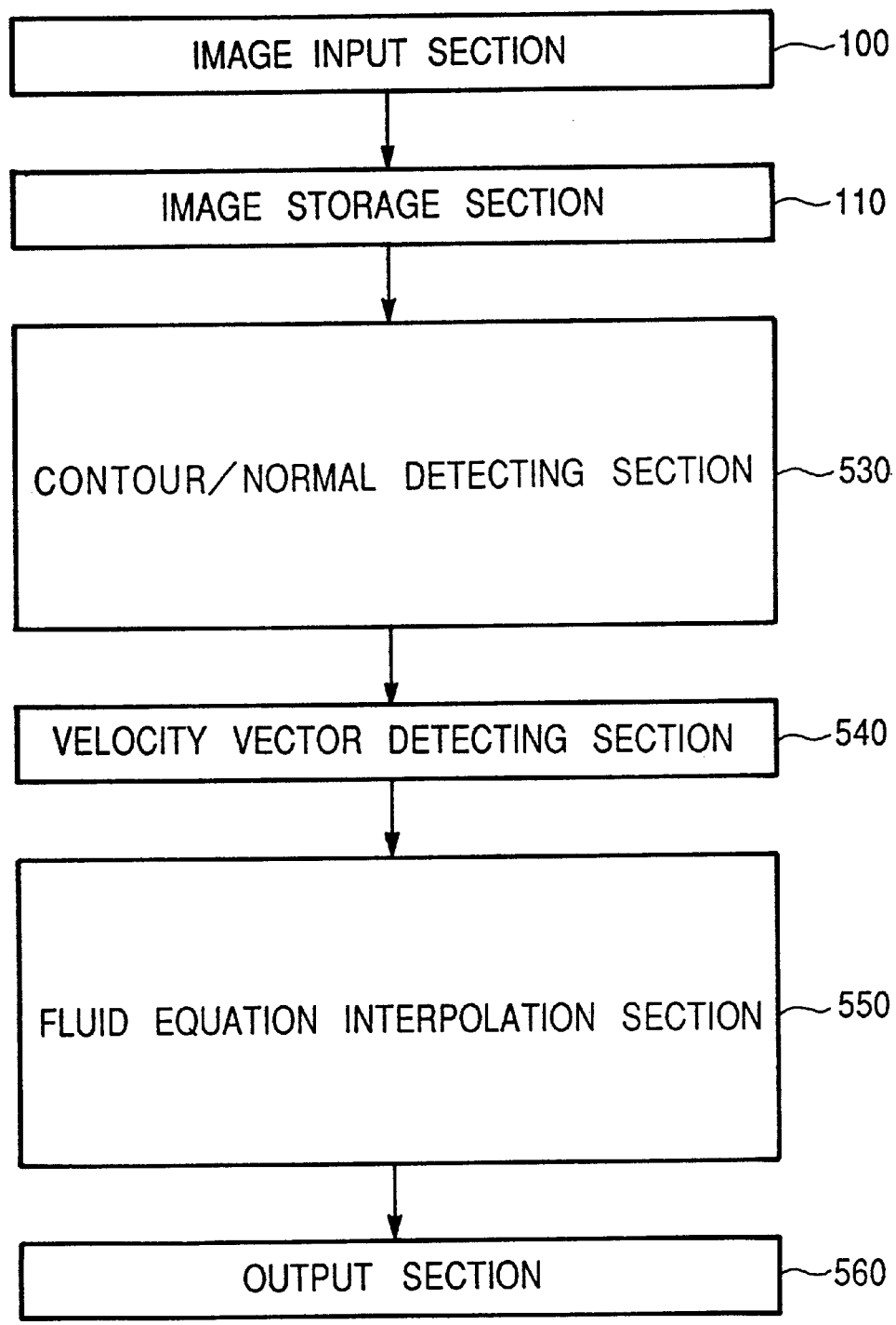
FIG. 24 is a block diagram showing a construction of the meteorological radar precipitation pattern prediction apparatus of embodiment 5 according to the present invention.

FIG. 23 is a flowchart of the meteorological radar precipitation pattern prediction method of the present embodiment, and FIG. 24 is a block diagram showing a construction of the meteorological radar precipitation pattern prediction apparatus for implementing the method.

In FIG. 24, image input section 100 and image storage section 110 are the same as those included in the apparatus as shown in embodiments 1–4. The apparatus of the present embodiment further comprises:

(1) contour/normal detecting section 530 for reading out the present and past image data to be compared for prediction; performing preprocessing operations for the comparison; dividing a precipitation region in the image data into blocks indicating "cloud blocks"; and for calculating a contour and normals relating to the contour for each block, (2) velocity vector detecting section 540 for extending normals (defined as relating to the previous contour); acquiring intersections of the extended normals and the next contour; and for calculating velocity vectors, (3) fluid equation interpolation section 550 for substituting the calculated local velocity vectors into specified terms of a specified fluid equation as initial values; calculating evaluated velocity values by iterating the time integral during a time necessary for the evaluation; and for predicting transition of the precipitation region by substituting the calculated predicted velocity values and the shape and gray-level information, and (4) output section 560 for outputting a predicted image according to a result predicted by the fluid equation interpolation section 550.

Hereinafter, each step of the meteorological radar precipitation pattern method of the present embodiment will be explained with reference to FIG. 23.

When prediction is started (see step S101), radar (echo) images of a desirable precipitation region among a desirable area are input at predetermined intervals from an external meteorological radar or the like by using image input section 100 (see step S102) and input image data are stored in image storage section 110 (see step S103). In this way, time-series past images are stored in the image storage section 110.

Next, the present image and a past image compared to the present one are extracted from image storage section 110 (see step S104). Then, in the contour/normal detecting section 530, a series of preprocessing steps for each image, which includes binarization of the precipitation region in the image; erosion/dilation; elimination of isolated points; labeling, and the like, is performed (see step S105), the precipitation region is divided into blocks corresponding to clouds (see step S106), and the contour and its normals are defined for each block with respect to the same labeling result (see step S107). These operations are performed for the present frame and other frames (one or more frames past) as comparative objects, as the occasion demands.

Next, in order to evaluate moving velocities between two frames of the precipitation-region image of each block, velocity vector detecting section 540 first performs expansion of normals of a previous block in the inside and the outside of the block, calculates the positions of intersections of the extended normals and the contour of the corresponding precipitation-region block of the subsequent frame, and then calculates and evaluates velocity vectors based on the lengths of the normals and an elapsed time (see step S108).

Then, in order to evaluate, based on the locally (or partially) evaluated velocity vectors, neighboring velocity vectors thereof, the fluid equation interpolation section 550 performs substitution of the evaluated local velocity vectors as initial values into the relevant terms of the fluid equation (see step S109) and calculates evaluated velocity values by iterating a time-based integral for a necessary period (see step S110). The section 550 further performs substitution of the evaluated velocity values and relevant shape and gray-level information into the relevant terms of the advection-diffusion equation (6) and predicts transition of the precipitation region (see step S111). The predicted results are output as an image via output section 560 (see step S112) and the operations are completed (see step S113).

Figure 25:
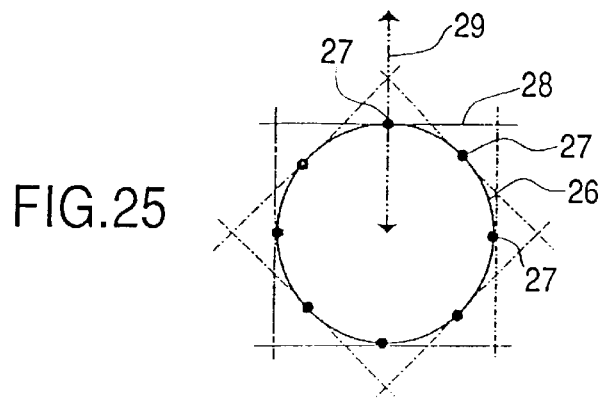
FIG. 25 is a typical plan for explaining the method of acquiring the contour and normals from each precipitation region-block.

FIG. 25 is a typical plan for explaining the method of acquiring the contour and normals from each precipitation region-block in the above step S107.

In the figure, reference numeral 26 indicates a contour, reference numerals 27 indicate contour points (i.e., points on the contour), reference numeral 28 indicates a tangent, and reference numeral 29 indicates a normal. Here, it is assumed that contour 26 which surrounds a precipitation region is drawn as a circle. This circle line is divided by a suitable number of the contour points (27). The direction of the tangent 28 relating to the contour point 27 can be defined based on a value of the central difference obtained by using the contour points 27 of both sides with the above contour point 27 as the center (refer to the known central difference method). Therefore, the direction of normal 29 equals a directional component, the inner product of which and the above directional component defined using the central difference method being zero. The above operations (or calculations) are performed with respect to all discrete contour points 27. If similar operations are applied to a precipitation pattern having a practical and complicated contour, it is necessary to perform a series of preprocessing such as binarization; erosion/dilation; elimination of isolated points; and labeling.

Figure 26A:
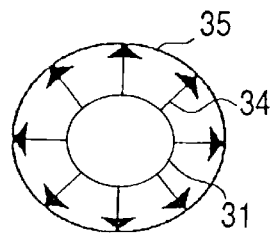
FIGS. 26A and 26B are typical plans showing examples in which the contour of the block of a precipitation region expands in the transition from an image frame to another frame ahead.
Figure 26B:
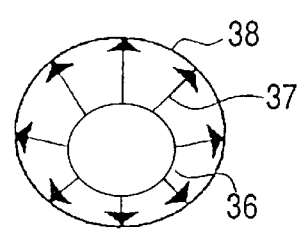

FIGS. 26A and 26B are typical plans showing examples in which the contour of the block of a precipitation region expands in the transition from an image frame to another frame ahead. FIG. 26A shows a state in which the contour expands isotropically while FIG. 26B shows a state in which the contour expands anisotropically. In these figures, reference numerals 31 and 36 indicate past contours, reference numerals 34 and 37 indicate normals, and reference numerals 35 and 38 indicate present contours.

The arrangement of the smaller circle with respect to the position of the larger circle is different between the cases shown by FIGS. 26A and 26B. Here, it is assumed that the smaller circle indicates a past precipitation region while the larger circle indicates the present precipitation region. In the case of FIG. 26A, transformation from the smaller to larger circles is obviously isotropic while in the case of FIG. 26B, the amount of transformation in the upper side is larger than that of the lower side. As explained above, transformation of the contour is generally not uniform.

Figure 27:
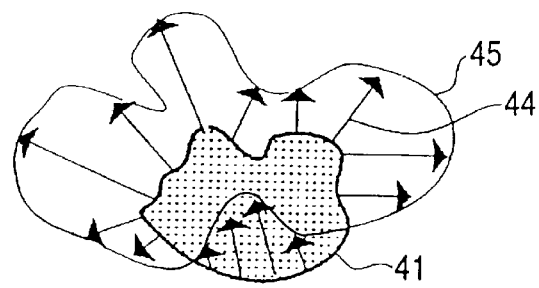
FIG. 27 is a typical plan showing a result of calculation of the amount of the contour transformation with respect to a real precipitation region.

FIG. 27 is a typical plan showing a result of calculation of the amount of the contour transformation with respect to a real precipitation region. In the figure, reference numeral 41 indicates a past contour, reference numeral 44 indicates a normal, and reference numeral 45 indicates the present contour, and in this example, a small (shaded) block considerably expands in the image of a plural number of frames ahead.

In detection of the contour for evaluating advection vectors, basic image processing, such as elimination of isolated points, and binarization, erosion/dilation, and labeling are performed several times as preprocessing, and the contour is detected using a contour- (or boundary-)search algorithm.

Here, normal 44 of the contour 41 of the shaded block is extended in the inner and outer sides, and a relative moving velocity is determined based on the amount of transformation up to the intersection on the larger contour 45. In this case, the precipitation region generally expands to the upper side, but also expands to the lower side. Therefore, the lower side of the precipitation region includes both convex and concave transformations. In the present embodiment, the intersection with a contour at a later time is determined by extending a normal in the inner and outer sides, as described above; thus, such a concave transformation can also be detected.

Figure 28:
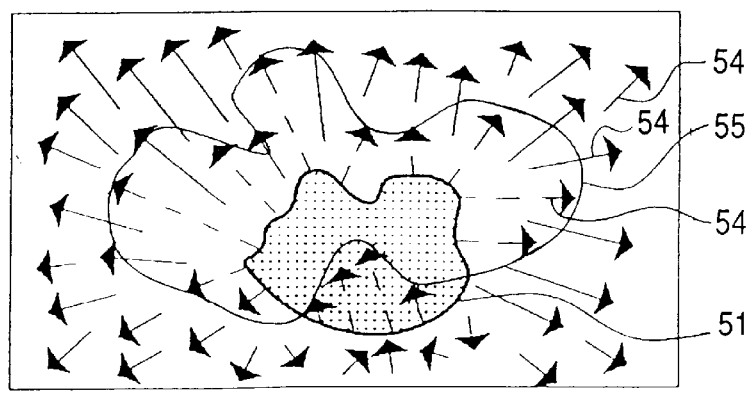
FIG. 28 is a typical plan showing a result of evaluating overall moving velocities using amounts of local transformations (that is, local moving velocities).

FIG. 28 is a typical plan showing a result of evaluating overall moving velocities using amounts of local transformations (that is, local moving velocities). In the figure, reference numeral 51 indicates a past contour, reference numerals 54 indicate velocity vectors, and reference numeral 55 is the present contour.

By substituting partially-evaluated initial moving velocities into the Navier-Stokes equation, overall moving velocities (i.e., advection velocities) from the next fame can be evaluated. By iterating a time-based integral, evaluated advection velocities can easily be obtained in the future frames. Instead, by iterating the operation using a moving average filter, overall advection vectors can be evaluated based on the locally-defined advection vectors.

The moving average filter is operated according to, for example, the following equations. Here, the moving average is calculated with respect to 9 points, for each of the horizontal and vertical components of the advection velocity.

$$\begin{cases} u_{i,j}^{k+1} \leftarrow \sum_{s1=-1}^{1} \sum_{s2=-1}^{1} u_{i+s1,j+s2}^{k} & (12) \\ v_{i,j}^{k+1} \leftarrow \sum_{s1=-1}^{1} \sum_{s2=-1}^{1} v_{i+s1,j+s2}^{k} & (13) \end{cases}$$

where, k=0, 1, 2 . . . K, and the initial advection velocity $(u_{i,j}^{0}, v_{i,j}^{0})$ is determined based on the initial frame.

Figure 29:
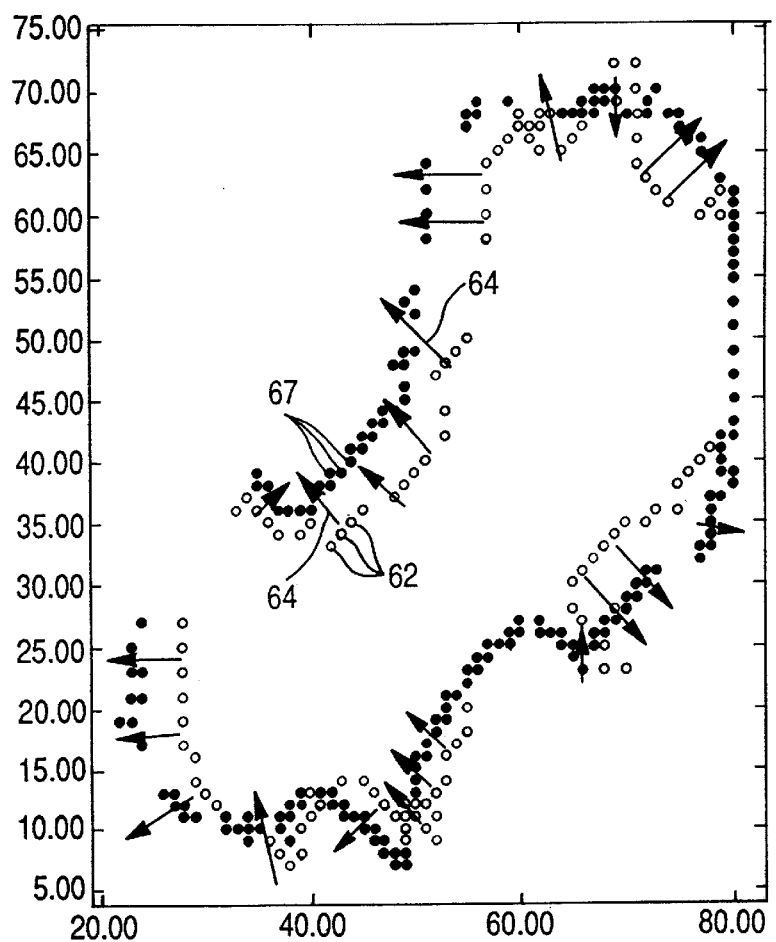
FIG. 29 shows an exemplary image on a display, which was obtained by calculating past and present contour points via fluid equation interpolation section 550 in FIG. 24 and the direction of each displacement was indicated on the display.

FIG. 29 shows an exemplary image on a display, which was obtained by calculating past and present contour points via fluid equation interpolation section 550 of the present apparatus and the direction of each displacement was indicated on the display. In the figure, reference numeral 62 indicates past contour points (i.e., white circles), reference numerals 64 indicate velocity vectors (i.e., arrows), and reference numeral 67 indicates present contour points (i.e., black circles).

That is, in the present embodiment, velocity vectors are roughly obtained based on the displacements of the contour, and then the moving average operation is iterated; thus, the following advantages can be obtained.
(1) "Smoothed" moving velocities can be obtained.
(2) If directions of neighboring moving vectors are variously different, overall vectors become smaller due to cancellation between them.
(3) If directions of neighboring moving vectors are alike, a "field of moving velocity" moving in such a direction is gradually formed.

Accordingly, the precipitation pattern is physically transformed in accordance with the fluid equation.

In addition to the repetitive interpolation and correction via the moving average operation, it is also possible to substitute the velocity vectors, which were obtained according to displacements of the contour, into the Navier-Stokes equation as initial values of the flow vectors in the equation, and to physically interpolate and correct velocity vectors of the next step. In particular, by using the Navier-Stokes equation, generation/disappearance of an "eddy" pattern can be predicted. Instead of the Navier-Stokes equation, the Burgers equation may be adopted to obtain similar results.

In the conventional methods, it is impossible to simultaneously and physically predict transitions of the shape and gray-level of a precipitation region. Additionally, regarding determination of the velocity vectors, it has not been considered that normals are searched and extended in the outside and inside of a contour as the present invention. Furthermore, generation/disappearance of a precipitation pattern accompanied with convection has not been considered at all; thus, prediction of approximately 30 minutes ahead has been possible at the best. In the prediction according to the present invention, generation/disappearance of a precipitation pattern is considered, and the prediction is performed based on a fluid-equation system which also considers a state in which small precipitation patterns approach to and merge with each other via the velocity vectors. Therefore, the present prediction is an easily-operated method in accordance with natural phenomena, whereby stable and accurate prediction of up to several hours ahead can be realized.

Figure 30:
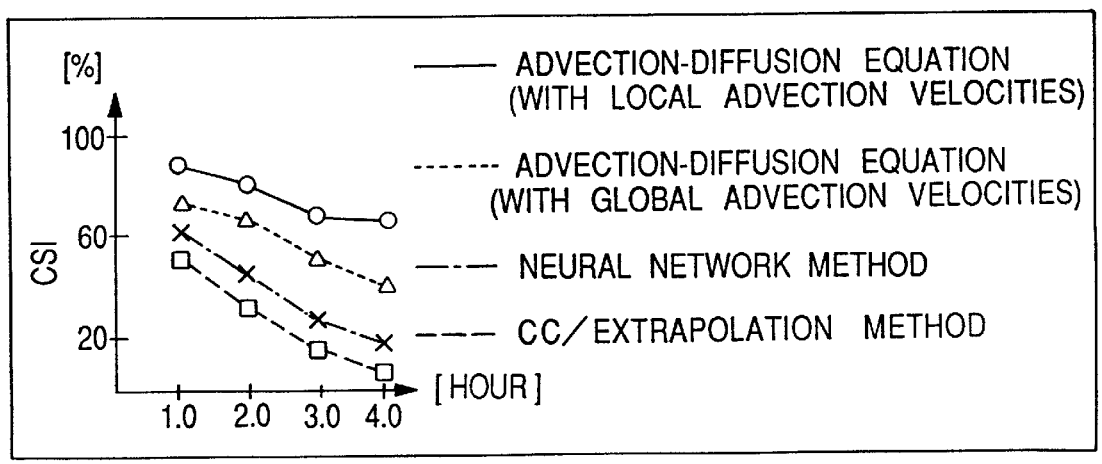
FIG. 30 is a graph diagram for comparing predicted results of embodiment 5 and the conventional methods.

FIG. 30 is a graph diagram for comparing predicted results of the present embodiment and the conventional methods. If the above-mentioned CSI is used, it can be recognized that the fall of the hitting ratio is much suppressed in the case of the present embodiment than the case of the conventional methods (i.e., the CC/extrapolation method or a method using a neural network model). In particular, when local advection velocities are supplied to a fluid equation according to the present embodiment, it can be recognized that the hitting ratio is much improved in comparison with a case in which advection velocities are uniformly (or globally) provided for a precipitation region.

According to the above results of performance estimation, it can be easily judged that the prediction of the present embodiment has considerably high accuracy. That is, higher and easier evaluation of moving velocities of a local precipitation region in comparison with the conventional methods, and a hitting ratio suitable for practical use can be achieved even for prediction of three hours or more in the future.

Embodiment 6

In the method of previous embodiment 3, it is possible to set and change the advection vector(s) or the diffusion coefficient(s) for each image region or each pixel. These features are also applied to the present embodiment, and easy introduction of topographical effects can be realized by previously defining an observed region and by predetermining conditions, for both regions on the sea and the land, (i) increase/decrease of the diffusion coefficient and (ii) increase/decrease of the amount of (given) weights with respect to the advection vectors.

Figure 31:
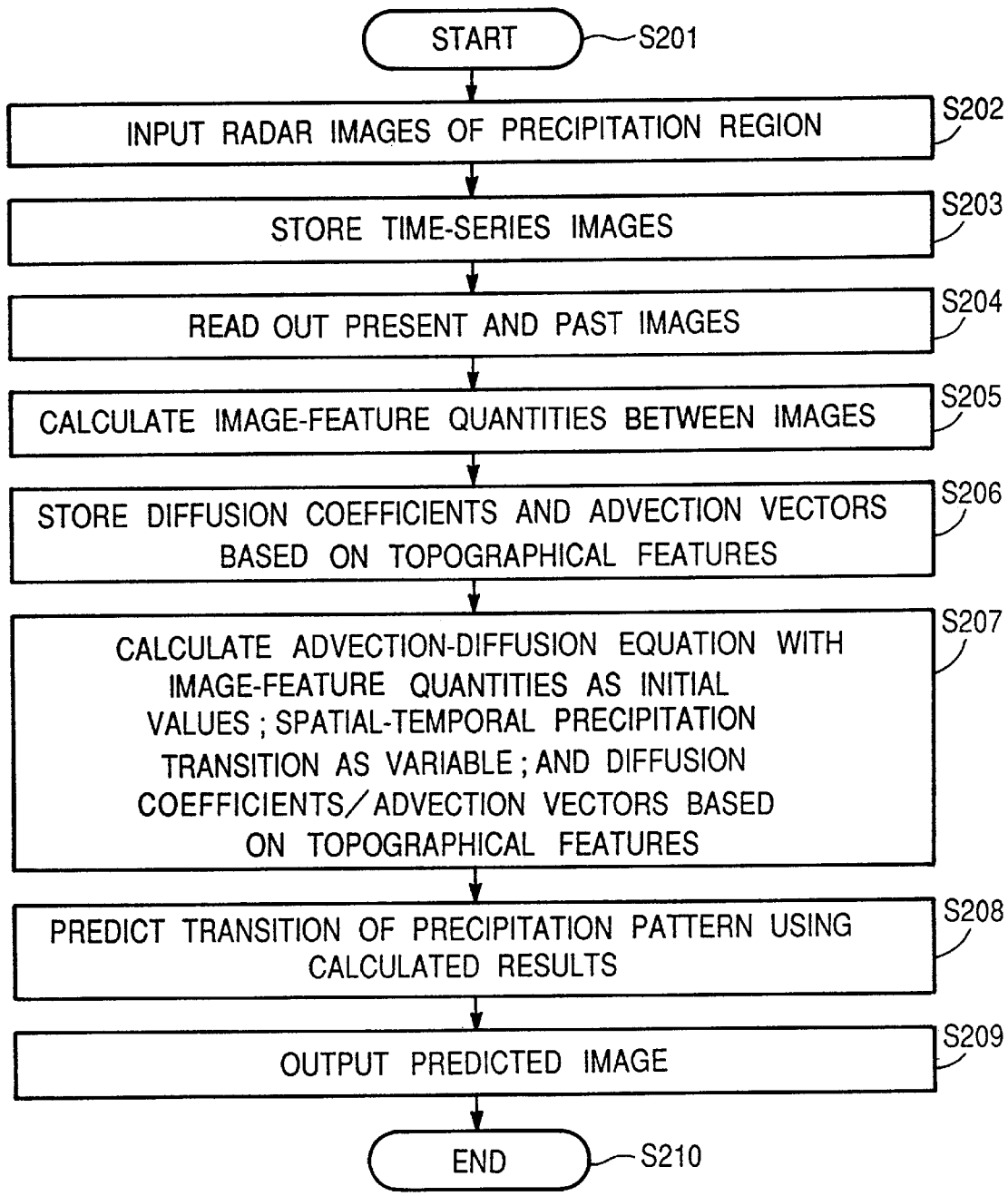
FIG. 31 is a flowchart of the meteorological radar precipitation pattern prediction method of embodiment 6.
Figure 32:
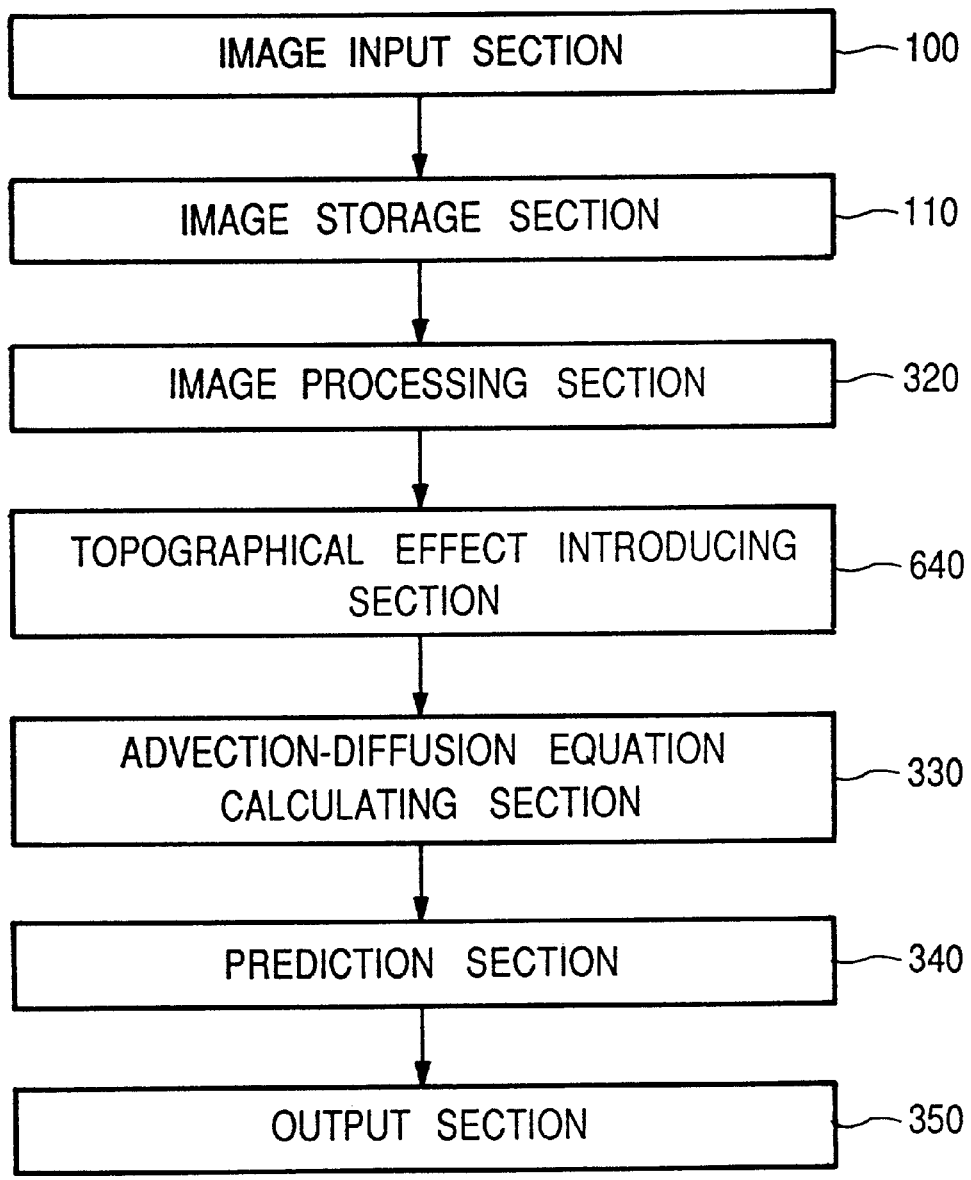
FIG. 32 is a block diagram showing a construction of the meteorological radar precipitation pattern prediction apparatus of embodiment 6.

FIG. 31 is a flowchart of the meteorological radar precipitation pattern prediction method of the present embodiment, and FIG. 32 is a block diagram showing a construction of the meteorological radar precipitation pattern prediction apparatus for implementing the method. In FIG. 32, parts which are identical to those shown in FIG. 13 (in Embodiment 3) are given identical reference numbers, and explanation therefor will be omitted here. That is, in this embodiment, topographical effect introducing section 640 is inserted between image processing section 320 and advection-diffusion equation calculating section 330.

The topographical effect introducing section 640 stores diffusion coefficients and evaluated advection vectors which are re-determined (or changed) in accordance with topographical features of an expected precipitation region. The advection-diffusion equation calculating section 330 performs calculation based on mathematical representation of the advection-diffusion equation with various image-feature quantities calculated by image processing section 320 as initial values, by regarding a spatial-temporal transition of the (amount of) precipitation as a variable, and also using the diffusion coefficients and advection vectors stored in the topographical effect introducing section 640. The prediction section 340 predicts a topographical-effect-added precipitation pattern according to the calculated results output from the section 330.

Next, each step of the meteorological radar precipitation pattern method of the present embodiment will be explained with reference to FIG. 31.

When prediction is started (see step S201), radar images of a desirable precipitation region among a desirable area are input at predetermined intervals from an external meteorological radar or the like by using image input section 100 (see step S202) and input image data are stored in image storage section 110 (see step S203). In this way, past time-series images are stored in the image storage section 110.

Next, the present image and a past image compared with the present one are extracted from the image storage section 110 (see step S204). Then, image-feature quantities such as the amount of precipitation transition and edge-gradient distribution between a series of extracted two or more two-dimensional images are calculated or detected in image processing section 320 (see step S205), and topographical effect introducing section 640 sets and stores diffusion coefficients and evaluated advection vectors in accordance with topographical features of an expected precipitation region (see step S206).

Then, the advection-diffusion equation calculating section 330 transforms the advection-diffusion equation into a discrete form via the difference calculus or the like based on mathematical representation of the equation with various image-feature quantities calculated by image processing section 320 and shape and gray-level information of the initial precipitation region as initial values, by regarding a spatial-temporal transition of the precipitation as a variable, and also using the diffusion coefficients and advection vectors stored in the topographical effect introducing section 640, and integrates the equation with respect to time (see step S207). The prediction section 340 predicts a topographical-effect-added precipitation pattern according to the calculated results (see step S208), and the shape and gray-levels obtained according to the predicted results are output as time-series images via output section 350 (see step S209) and the operations are completed (see step S210).

The advection-diffusion equation used in the advection-diffusion equation calculating section 330 is the same as the equation (6) explained in Embodiment 3.

In the calculation of the rate of the one-dimensional area change for setting (or changing) the diffusion coefficients, the area change of the precipitation pattern is practically obtained using an image processing method in which the number of pixels are simply counted for each frame.

FIG. 33 is a typical graph diagram showing a relationship between the rate of the area change and the diffusion coefficient. In order to change the diffusion coefficient(s) in connection with the rate of the area change, the rate is calculated from the precipitation pattern and "inverse Z-shaped" transition of the diffusion coefficient is provided. That is, if the rate of the area change is positive, which indicates that the precipitation pattern is in a growing phase, then the diffusion coefficient is increased. In contrast, if the rate of the area change is negative, which indicates that the precipitation pattern is in a decaying phase, then the diffusion coefficient is decreased. Here, the diffusion coefficient is not set to be "zero" but is asymptotically made close to zero.

FIGS. 34A and 34B are typical diagrams for explaining a relationship between topographical effects and relevant parameters. FIG. 34A is a typical diagram showing time-series transition of a precipitation pattern, while FIG. 34B is a typical diagram showing large and small patterns of the advection and diffusion coefficients. In the figures, reference numeral 111 indicates an ocean region, reference numeral 112 indicates a land region, reference numeral 113 indicates a precipitation pattern, reference numeral 114 indicates a state of large advection and a small diffusion coefficient, and reference numeral 115 indicates a state of small advection and a large diffusion coefficient.

Here, ocean region 111 and land region 112 lie in a radar observation scope as an exemplary case in which the precipitation pattern moves between the ocean and land regions. At an initial phase, small precipitation pattern 113 on the sea gradually enters the land by advection, whereby the precipitation pattern gradually grows. Smaller precipitation patterns lie scattered behind the above precipitation pattern. The time span in which such smaller precipitation patterns on the sea are observed by the radar is shorter than that taken in the case of a precipitation pattern on the land. This is because when precipitation pattern 113 comes close to the land, an advection component is weakened due to friction with the land and a vertical convection component becomes predominant; thus, while supply of aqueous vapor continues from the sea, the precipitation region continues expanding although the moving velocities of the precipitation pattern on the land slow.

It is easy to incorporate topographical effects relating to the ocean and land regions into the advection-diffusion equation by adjusting the advection vectors and the diffusion coefficients. That is, each pixel is weighted based on advection vectors which are evaluated in a manner such that the advection component is set larger with respect to the ocean region but is set smaller with respect to the land region, and the diffusion coefficient is set larger on the sea and is set smaller on the land.

Figure 35:
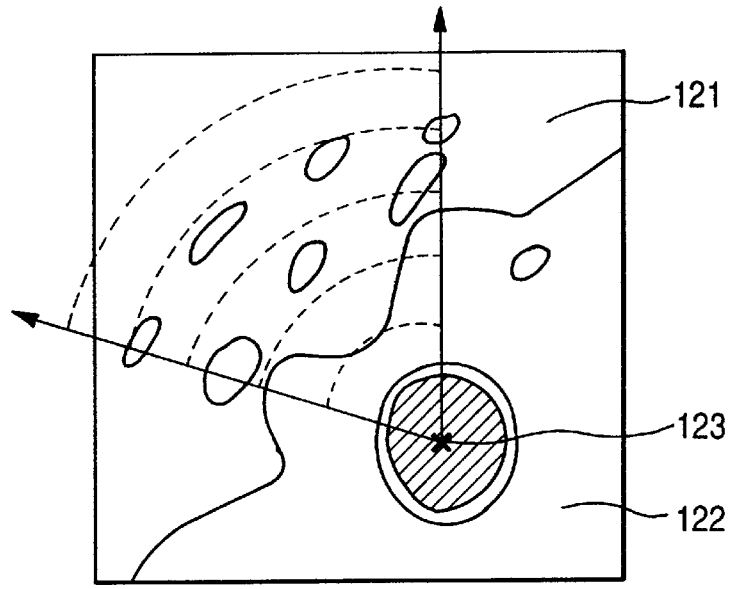
FIG. 35 is a typical illustration for explaining a method for increasing or decreasing the diffusion and dispersion coefficients according to the distance from the center of precipitation.

FIG. 35 is a typical illustration for explaining a method for increasing or decreasing the diffusion and dispersion coefficients according to the distance from the center of precipitation. In the figure, reference numeral 121 indicates an ocean region, reference numeral 122 indicates a land region, and reference numeral 123 indicates the center of precipitation.

The center (part) of convection always exists in a precipitation pattern and corresponds to a region having a high edge-gradient. In proportion to the distance from the precipitation center 123 which is the center of gravity of this region, a smaller diffusion coefficient and a larger dispersion coefficient are defined. Such set-up (or changes) of the coefficients are performed during prediction using the advection-diffusion equation. Here, the diffusion coefficient is determined and supplied for each pixel regarding $\lambda_{i,j}$ in equation (7).

In addition, it is appropriate to perform the detection of displacement of the center 134 of gravity of the region having a high edge-gradient (as shown in FIG. 16) together with the CC method in which points corresponding to each other cannot always be stably determined between frames.

Figure 36:
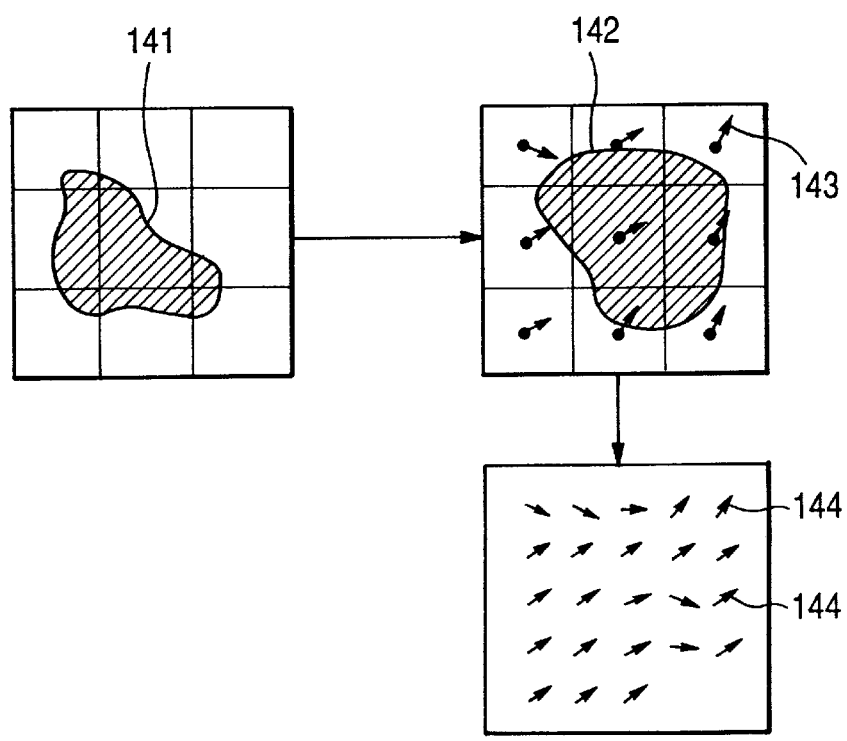
FIG. 36 is a typical illustration showing an example of detection of displacement of a precipitation pattern based on the CC method.

FIG. 36 is a typical illustration showing an example of detection of displacement of a precipitation pattern. In the figure, reference numeral 141 indicates a past precipitation pattern, reference numeral 142 indicates a present precipitation pattern, and reference numerals 143 and 144 indicate moving vectors.

In this example, a frame is divided into 9 small blocks and a cross-correlational coefficient is calculated between the corresponding small blocks in the present and the next frames. That is, regarding each small block, the distance and direction relating to points having the highest similarity are calculated, and moving vector 143 in the small block is determined according to these calculated results. Here, unlike the conventional methods, these moving vectors are not directly used as advection vectors for the linear extrapolation of a precipitation region. Instead, interpolation is performed such that advection vectors (i.e., the above moving vectors) are propagated for every pixel in the small block by using a moving average filter. The advection vectors 144 as obtained above are provided for the advection-vector term relating to each pixel in the advection-diffusion equation.

In the present embodiment, the amounts of the diffusion coefficients and the sizes of the advection vectors are set or shifted according to the position where a predicted precipitation region exists, for example, a sea or land region, whereby topographical effects which influence the relevant precipitation pattern are adjusted so as to improve prediction accuracy.

Figure 37A:
FIGS. 37A and 37B are graph diagrams for comparing evaluated results of the predictions according to embodiment 6 and the conventional method.
Figure 37B:
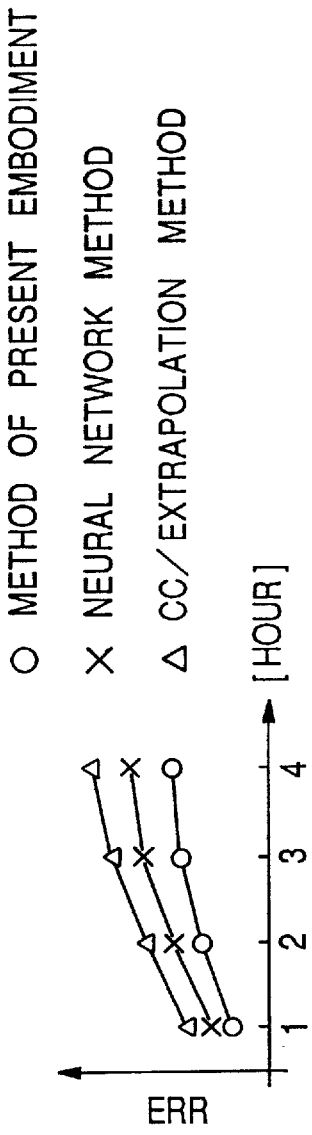

FIGS. 37A and 38B are graph diagrams for comparing evaluated results of the predictions according to the present embodiment and the conventional method. FIG. 37A shows comparative results based on the CSI while FIG. 37B shows comparative results based on the ERR.

According to these results, the decline of hitting ratio is much more suppressed than in the case using the conventional method (the CC method or a method using a neural network model), and also regarding the predicted amount of precipitation, better results can be obtained in the present invention. In consideration of the above results of performance evaluation, it can easily be understood how high the accuracy of the present embodiment (i.e., the present invention) is. Additionally, in the case of a stationary precipitation region, a hitting ratio suitable for practical use can be achieved even in predictions 5 or 6 hours in advance, although predictions 2 or 3 hours in advance have been the limit in conventional cases.

At the time of prediction, two-dimensional image data which cover the past 30 minutes or the like may be stored in the memory in a calculator being used, and one-dimensional data relating to the area and intensity transitions which cover the past one hour or the like may also be stored in the memory.

As explained above, according to the present embodiment, a time-dependent physical equation and image processing methods are appropriately combined and topographical effects are further added. In this way, the gray-levels, shape, and the like can be more appropriately predicted as actual precipitation region and amounts of the precipitation; thus, a hitting ratio based on higher accuracy can be realized.

Embodiment 7

In the present embodiment, in order to evaluate moving velocities of a non-rigid object such as a precipitation pattern, three methods such as the CC method, a contour displacement method, and the third method of moving the center of gravity relating to a region with a high edge-gradient are simultaneously used so as to accurately evaluate characteristics of the movement of an object whose transformation (or metamorphosis) is complicated. Additionally, regarding the prediction of transition of the advection vectors, a non-linear advection-vector transition is predicted with the advection vectors evaluated via the above three methods as an initial set of vectors, and by repeatedly propagating these initial vectors using a moving average filter. Then, according to the predicted results, transition of the precipitation pattern can be predicted based on equation (6), similar to Embodiment 3 or 6.

Figure 38:
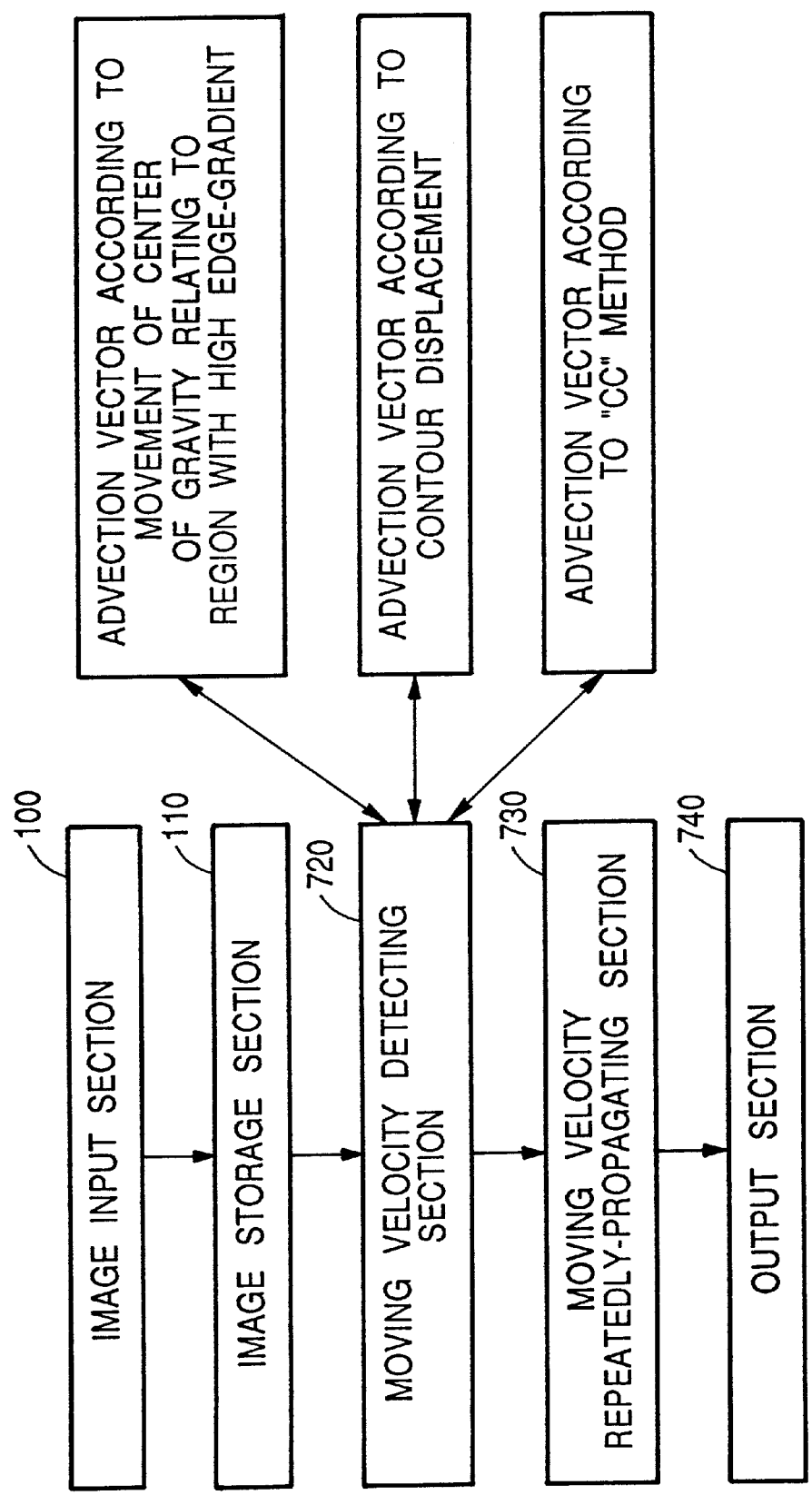
FIG. 38 is a block diagram of the flow velocity evaluation apparatus in embodiment 7.

FIG. 38 is a block diagram of the flow velocity evaluation apparatus in the present embodiment.

In the figure, image input section 100 and image storage section 110 are the same as those included in the apparatus of each embodiment mentioned above. The evaluation apparatus, in which image processing techniques are applied for evaluating moving velocities of an object, further comprises moving velocity detecting section 720 for detecting the moving velocities of a precipitation pattern by simultaneously using the CC method, the contour displacement method, and the method of moving the center of gravity relating to a region with a high edge-gradient; moving velocity repeatedly-propagating section 730 for propagating the advection vectors, which are evaluated by using the three methods and regarded as initial vectors, throughout the image by using the moving average filter; and output section 740 for outputting predicted results.

Figure 39:
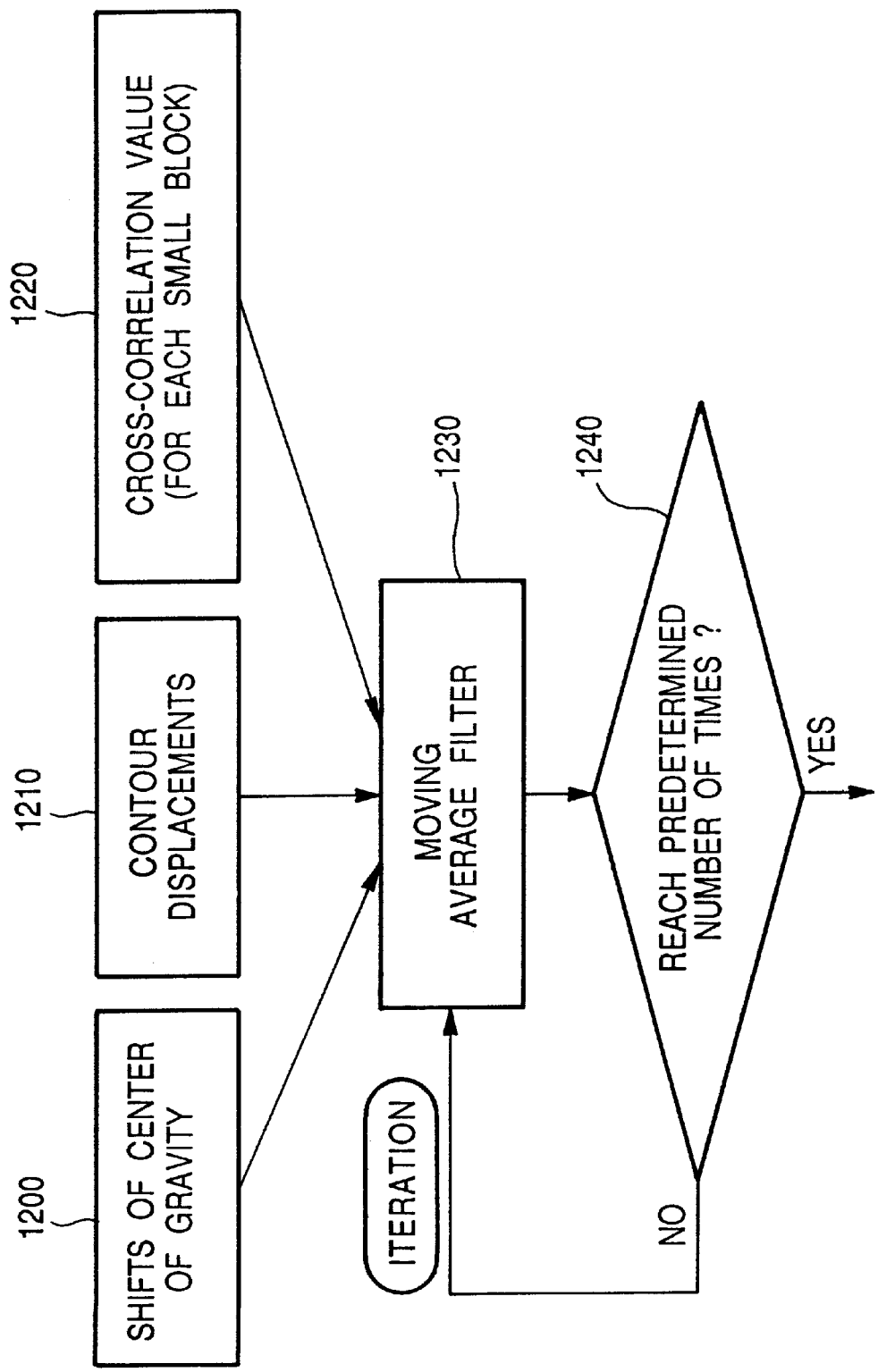
FIG. 39 is a flowchart for explaining operations of moving velocity detecting section 720 and moving velocity repeatedly-propagating section 730.

FIG. 39 is a flowchart for explaining operations of mo ring velocity detecting section 720 and moving velocity repeatedly-propagating section 730.

The moving velocity detecting section 720 acquires an edge (i.e., the first derivative) image of a precipitation pattern via an image processing method and determines a suitable threshold value. The section 720 regards a "significant point", such as a region having a high edge-gradient (with respect to the threshold value), a region having a low edge-gradient but having high gray-levels, or the center of convection, as the center of gravity, and evaluates advection vectors based on (i) shifts of the center of gravity (called "center-of-gravity shift base", hereinafter)(see step S1200), (ii) displacement of a contour (see step S1210), and (iii) the CC method (see step S1220).

Next, in the moving velocity repeatedly-propagating section 730, with the set of vectors as determined above as an initial set of vectors, the operation using the moving average filter is iterated by a predetermined number of times (i.e., n times) (see steps S1230 and S1240). By establishing correspondence between the iteration number of times (i.e., n times) and a necessary prediction time, non-linear evaluation (or prediction) of advection vectors can be realized.

Figure 40:
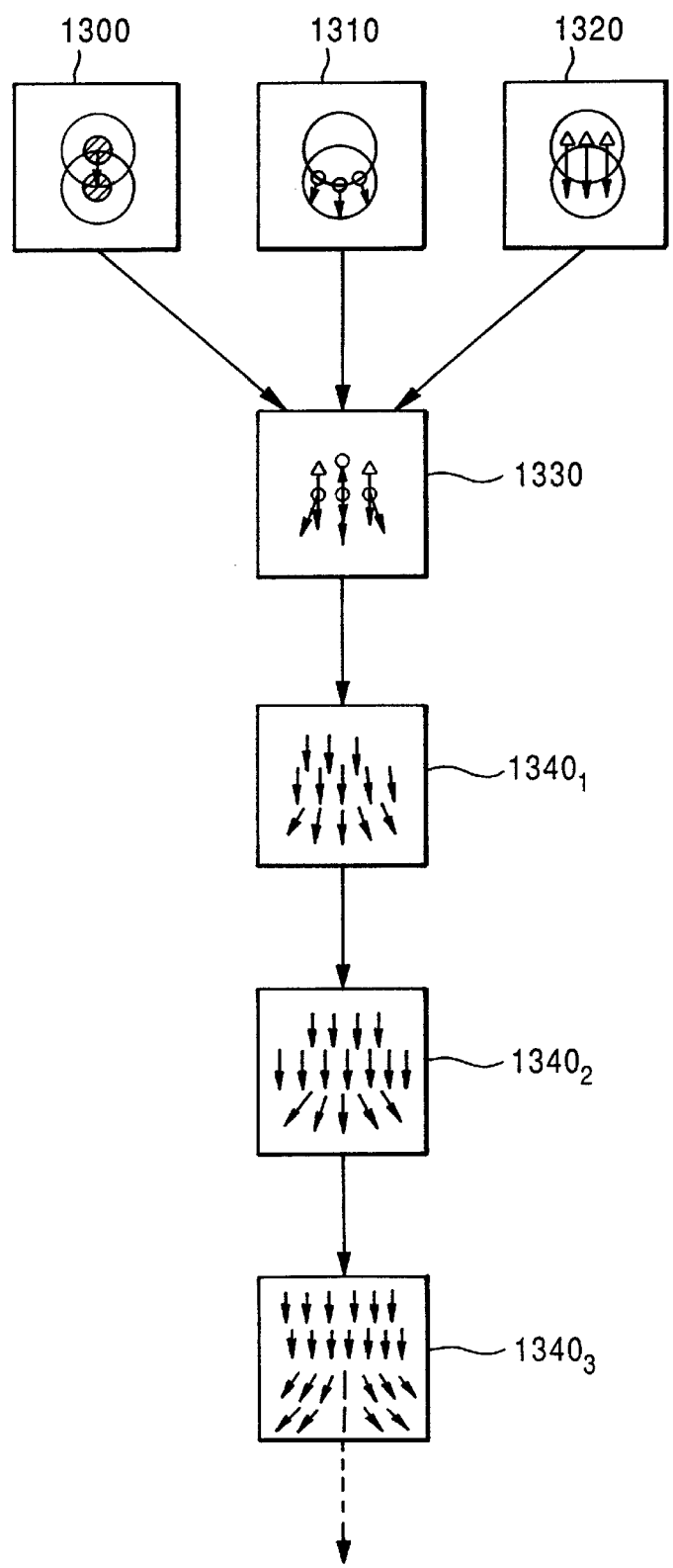
FIG. 40 is an explanatory illustration corresponding to each step in FIG. 39.

FIG. 40 is an explanatory illustration corresponding to each step in FIG. 39. This figure shows three cases for determining the advection vectors such that:

(1) movement of the center of gravity is followed with respect to a series of images, based on the center-of-gravity shift base (see reference numeral 1300), (2) intersections between the present contour and normals with respect to a past contour are determined (see reference numeral 1310), and (3) the image is divided into plural small blocks and the CC method is applied to small blocks (corresponding to each other) in different images (the advection vector is determined with respect to each small block) (see reference numeral 1320).

With the set of advection vectors as obtained above as initial vectors (see reference numeral 1330), the moving average filter is repeatedly applied to each component (horizontal/longitudinal) of the relevant two-dimensional image (see reference numerals 13401, 13402, 13403). As the number of iterations increases, advection vectors are gradually propagated into a zero region. The above operations are thus based on a non-linear evaluation of the advection vectors.

In the present embodiment, contour features are also important for evaluating the advection vectors and thus displacements of the contour are detected and used. As seen in a precipitation pattern in the meteorological radar echo image, if the pattern expands on all sides, the displacement of the contour is a factor for determining the shape of the precipitation pattern in most cases.

Additionally, the CC method contains a problem in which moving vectors may be evaluated as zero although the relevant face actually moves; however, such a problem can be solved here by using the displacements of the contour and follow-up of the center of gravity of a region with a high edge-gradient together.

When the advection vectors are evaluated based on shifts of the center of gravity, a low-pass filter may be used and operated after three or more centers of gravity are detected (and stored).

The region having a high edge-gradient almost corresponds to a center region of convection or turbulent flow with respect to a fluid observed in the meteorological radar echo image or in an experiment of the fluid engineering. Energy is concentrated in such a center region; thus, the region is clear while a kind of pattern is maintained. Furthermore, movement of the pattern is accompanied with movement of the center (of gravity) of such convection or turbulent flow. Therefore, as a stable advection-vector evaluation method, it is effective to follow the center of gravity of such a region by using the image processing methods.

Figure 41:
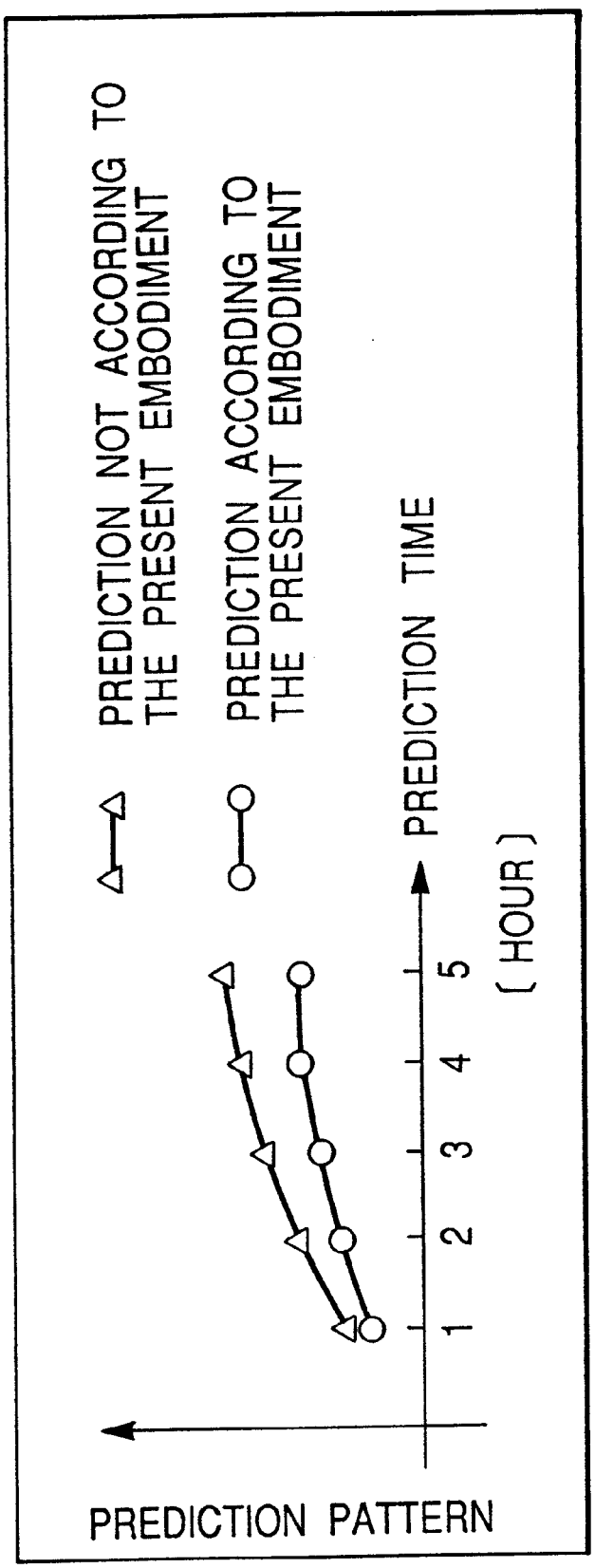
FIG. 41 is a graph diagram showing evaluated results obtained when the advection vector evaluation method according to embodiment 7 was used.

FIG. 41 is a graph diagram showing evaluated results obtained when the advection vector evaluation method according to the present embodiment was applied to a meteorological radar echo pattern and then a transition of a precipitation pattern is predicted. Regarding the prediction accuracy, it can be observed that prediction to which the present embodiment is applied could be improved in comparison with prediction to which the present embodiment is not applied. Here, in each cases, the transition of the precipitation pattern was predicted based on equation (6). The source and sink terms in the equation are determined such that (two) consecutive images are binarized and a difference image between them is obtained, and then a value belonging to (or relating to) a positive region in the difference image is provided to the source term while a value belonging to a negative region in the same image is provided to the sink term. Regarding the diffusion coefficients, a table for storing a linear relationship between transitions of the area and the diffusion coefficient is previously defined and maintained.

Accordingly, by appropriately using the above-mentioned three methods, the moving (especially, advection) vectors can be stably extracted even for an object in which generation and disappearance are remarkable, such as a precipitation pattern.

In each embodiment explained above, two or more past images selected from image storage section 110 may be time-series consecutive images or may be sampled out according to the sampling rate and the moving velocity of the object.

In addition, instead of the finite difference method (FDM), the advection-diffusion equation may be solved using the finite element method, or the spectral method in which an equation defined in a time region is Fourier-transformed and solved in a spatial region and is then inverse-Fourier-transformed so as to be returned to the time region.

Specific example of evaluation

Hereinbelow, results are given of estimating a practical example of prediction to which the methods according to the present invention are synthetically applied.

Figure 42:
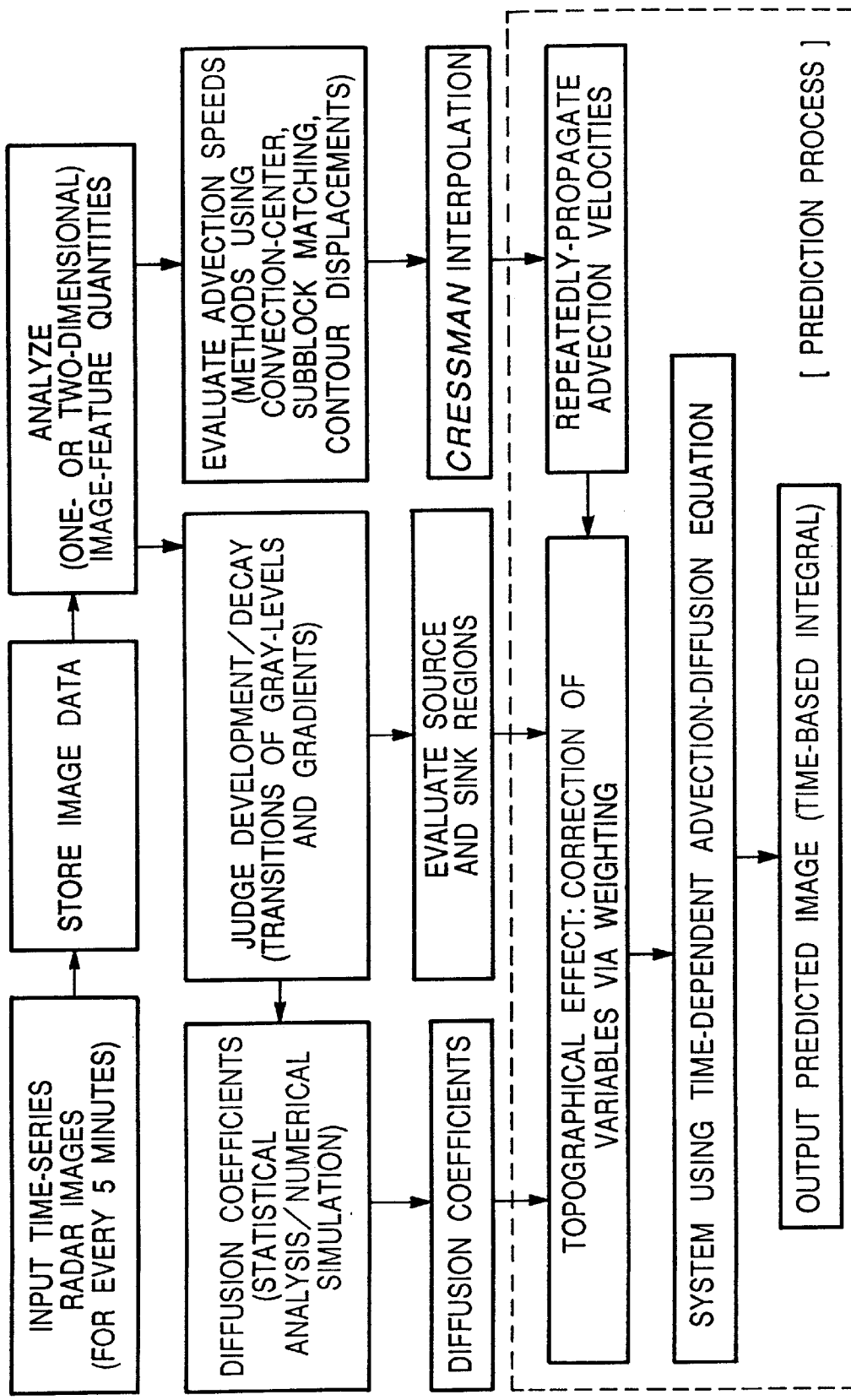
FIG. 42 shows the framework of a prediction method used in a practical example in which the methods according to the present invention were synthetically used.

FIG. 42 shows the framework of a prediction method used in this example. When a predicted image is formed, parameters relating to one frame of an actual precipitation-pattern image at the beginning of the prediction are input into equation (7). Regarding evaluation of the rate of area change and prediction of sink regions, a difference was calculated with respect to frames 6 past patterns (or frames before prediction) separated from each other (this separation corresponds to units of 30 minutes).

Regarding topographical-numerical data, a cross-section diagram at 500 meters above sea level, which was considered to relate to the precipitation pattern, was chosen and the diagram was converted into ternary data (corresponding to the sea, mountain, and land (less than 500 meters) regions so as to use them in the prediction. Other parameters are shown together in the list presented in FIG. 43. The following are predicted results relating to plural patterns.

1. Example of growing phase (a) layer pattern

Figure 44:
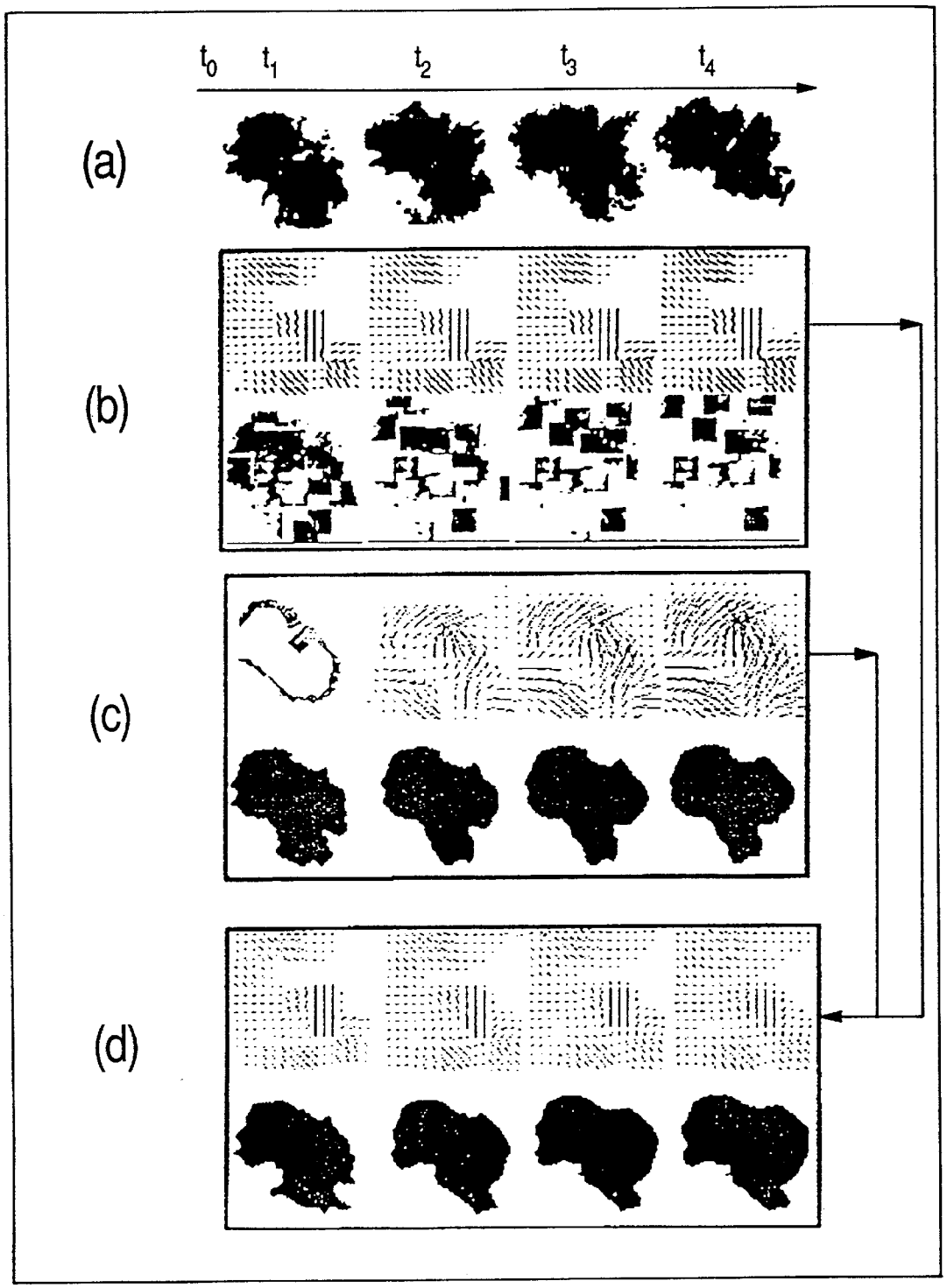
FIG. 44 is a diagram showing predicted results with respect to a layer precipitation pattern in the practical example.

This is a layered and rapidly-growing precipitation pattern which provides a sudden increase of precipitation in a short time. Exemplary predicted results are shown in FIG. 44.

In the figure, part (a) indicates real images after 1, 2, 3, and 4 hours have elapsed (time $t_1, t_2, t_3, t_4$) from time to of the beginning of the prediction for rain clouds in 340×340 km$^2$ domain.

Part (b) indicates predicted results at time $t_1, t_2, t_3, t_4$ from the prediction start time $t_0$, according to the CC method including the subblock matching method. The upper side shows relevant advection vectors while the lower side shows predicted images.

Part (c) indicates predicted results at time $t_1, t_2, t_3, t_4$ from the prediction start time $t_0$, according to the contour displacement method based on the advection vectors.

Part (d) indicates predicted results obtained using both CC (subblock matching) and contour displacement methods.

The real pattern after 4 hours have elapsed is slightly, rotated in the counterclockwise direction while the pattern is also shifting to) the upper right in a diagonal direction. Additionally, the front part in the direction of the shift has grown while the rear part has decayed. The prediction using the subblock matching method and the linear extrapolation method (i.e., the results in part (b)) is obviously concluded in a worse hitting ratio; however, it can be concluded that the methods according to the present invention almost detected features of real patterns.

Additionally, in the upper side of the patterns in the figure, advection vectors extracted via each relevant method and results of smoothing and propagation to a zero region using the repetitive propagation method with the advection vectors as initial vectors are shown together. The figure clearly indicates that by using the the repetitive propagation method, advection vectors almost determined the shape of the precipitation pattern 4 hours later. If the conventional method in which the precipitation pattern is just linearly translated is used, such prediction for a non-linear rotation of the precipitation pattern is very difficult.

(b) stripe pattern

This pattern may cause a serious flood due to a large total amount of precipitation. Here, it was examined how a model using various physical effects influences such a pattern. The conditions used are presence/absence of diffusion, advection, topographical, source, and sink effects, as shown in FIG. 45A. In particular, the source effect was considered in two cases of (i) "on the sea only", and (ii) "on the sea and the center part of convention". Among possible combinations with respect to the above conditions, predicted images relating to the actual pattern transition shown in FIG. 45B are shown in 6 cases in FIG. 45C.

Result [a]: The entire precipitation pattern uniformly expanded and was slightly rounded in the condition of "diffusion only".

Result [b]: The advection effect was added to the diffusion effect; thus, the entire pattern flowed from the upper left to the lower right (in the figure) while maintaining its roundish shape.

Result [c]: The pattern was subjected to the advection and flowed in a diagonal direction. Here, the dispersion effect was considerably generated on the land according to the topographical effect.

Result [d]: A source was generated only on the sea (refer to the inside of the roundly-circled part); thus, the pattern was transformed into a narrow shape due to the advection. Considerably lower gray-levels than real levels are distributed in the predicted image.

Result [e]: Sources were generated both on the sea and the center part of convention (refer to the inside of the roundly-circled parts in the figure); thus, the pattern was transformed into a triangle shape. Especially near the mountain area (refer to the inside of the squarely-circled part), the predicted pattern was similarly developed to the real pattern and no growth in a diagonal direction was generated.

As shown above, patterns can be anisotropically represented in the prediction method according to the present invention. On the other hand, if a source is continuously generated, there occurs a problem in which the number of regions having gray-levels larger than the real levels is increased. The following is the result in which such a problem did not occur.

Result [f]: After the start of prediction, a source was intermittently provided (i.e., generated) for each 30 minutes with other conditions which are the same as those in the above result [e]. In this case, the shape and gray-levels were closer to the real shape and levels.

2. Example of decaying phase

Figure 46:
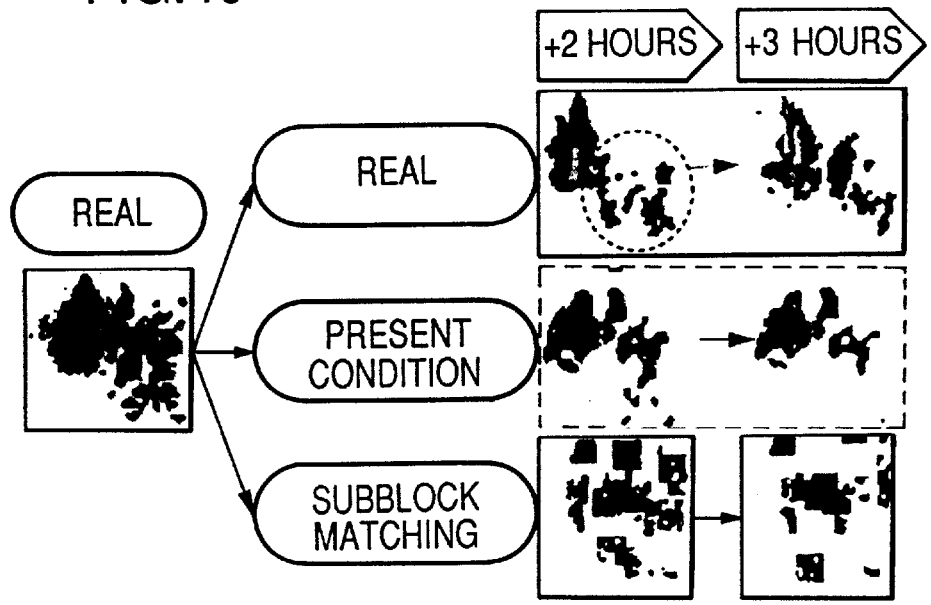
FIG. 46 is a diagram showing predicted results for a precipitation pattern in a decaying phase in the practical example.
Figure 47:
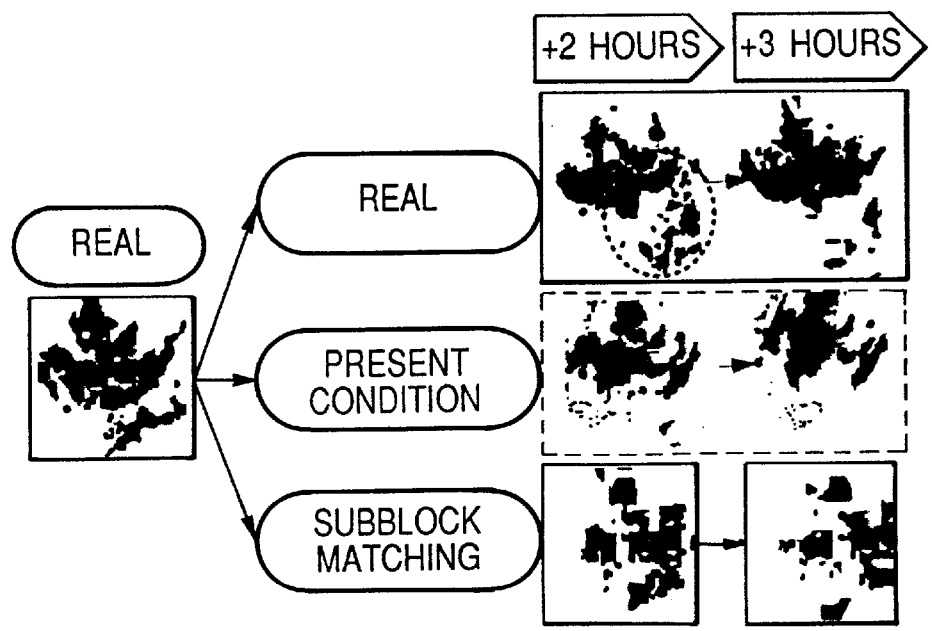
FIG. 47 is a diagram showing predicted results for another precipitation pattern in a decaying phase in the practical example.

Next, results for two precipitation patterns in the decaying phase are shown in FIGS. 46 and 47. The conditions mentioned in the above "result [f]" are also used here.

The "real" precipitation pattern was generally decayed although it includes partially growing areas. Furthermore, the ratio of decay is different for each region. In the image predicted according to the present invention, it can be observed that decayed areas (for example, see the circled area) were almost correctly predicted.

In contrast, the CC method using the subblock matching does not include physical representation of the growth or decay of the precipitation pattern, and thus has limits for prediction suitable for such a pattern. Accordingly, it can be indicated that the method according to the present invention is also effective for local and unsteady prediction in the decaying phase.

Application example

Among embodiments according to the present invention explained above, the prediction method and apparatus using the advection-diffusion equation can also be applied to prediction of gas distribution instead of the prediction of precipitation patterns. As a gas, carbon monoxide, nitrogen oxides, and sulfur oxides, and the like discharged into the air are considered. This application is possible because the concentration distribution of gas(es) discharged into the air has characteristics similar to the intensity (i.e., gray-level) distribution of a precipitation region having advection, diffusion, dispersion, and the like, and thus prediction operations similar to those using the advection-diffusion equation can be performed. Accordingly, influences of chemical substances on an observed region can be predicted.

What is claimed is:

1. A meteorological radar precipitation pattern prediction apparatus comprising:

image input means for inputting radar images of a precipitation region;

image storage means for storing the input radar images as time-series two-dimensional images;

image processing means for calculating various image-feature quantities with respect to two or more two-dimensional past images stored in the image storage means;

calculation means for calculating a spatial-temporal transition of the amount of precipitation using an advection-diffusion equation system which indicates various physical effects relating to precipitation phenomena, with the various image-feature quantities as initial values;

prediction means for predicting transition of a pattern with respect to the precipitation region based on results calculated by the calculation means; and output means for outputting predicted results as time-series images.

2. An apparatus as claimed in claim 1, wherein the advection-diffusion equation system includes diffusion coefficients and evaluated advection vectors, and the apparatus further comprises:

topographical effect introducing means for setting the diffusion coefficients and the advection vectors in accordance with topographical features of the precipitation region.

3. An apparatus as claimed in claim 1, wherein the advection-diffusion equation system includes an advection term which is a product of an advection vector and the first derivative with respect to a gray-level of a relevant pixel.

4. An apparatus as claimed in claim 1, wherein the image processing means extracts a region having gray-levels greater than a fixed level from each input two-dimensional image and counts the number of pixels belonging: to the extracted region, and determines the counted number of pixels as an area of a precipitation region in the relevant frame.

5. An apparatus as claimed in claim 1, wherein the advection-diffusion equation system includes time, advection, diffusion, source, sink, and dispersion terms, and a gray-level at each pixel is supplied to the equation as a variable corresponding to an amount of precipitation.

6. An apparatus as claimed in claim 5, wherein diffusion coefficients included in the diffusion term are set in accordance with a rate of change with respect to one-dimensional area transition.

7. An apparatus as claimed in claim 6, wherein one-dimensional non-linear area transition is predicted using extrapolation by approximately fitting a predetermined non-linear function up to a predetermined prediction time, whereby the rate of change with respect to one-dimensional area transition is obtained and corresponding diffusion coefficients are changed according to the obtained rate.

8. An apparatus as claimed in claim 5, wherein data relating to positive and negative regions which are determined by calculating difference between two of the two-dimensional past images are supplied to the source and sink terms of the equation, respectively.

9. An apparatus as claimed in claim 1, wherein the image-feature quantities include an edge-gradient which is the first derivative of an gray-level.

10. An apparatus as claimed in claim 9, wherein the image processing means divides the pattern of the precipitation region into one or more regions having a large edge-gradient and one or more regions having a small edge-gradient with respect to a predetermined value.

11. An apparatus as claimed in claim 5, wherein the image processing means divides the pattern of the precipitation region into one or more regions having a large edge-gradient and one or more regions having a small edge-gradient with respect to a predetermined value, calculates the center of gravity of each region having the large edge-gradient, and weights an amount of sinking relating to the sink term according to a distance from the center of gravity, and in proportion to the distance from the center of gravity, a larger dispersion coefficient is supplied to the dispersion term.

12. An apparatus as claimed in claim 10, wherein the image processing means sets advection vectors supplied to the advection-diffusion equation system by extracting a shift of the center of gravity of each region having the large edge-gradient.

13. An apparatus as claimed in claim 12, wherein if advection in the relevant precipitation region is strong, the image processing means also extracts a shift of the center of gravity of each region having the small edge-gradient so as to set the advection vectors.

14. An apparatus as claimed in claim 3, wherein the image processing means determines the advection vectors of the pattern of the precipitation region by dividing each frame into plural small blocks and calculating a direction and a distance relating to points having the highest similarity between two frames of the images based on the Cross Correlation method, and evaluates overall advection vectors throughout the frame by iterating an operation using a moving average filter.

15. An apparatus as claimed in claim 3, wherein the image processing means evaluates the advection vectors in the image from a precipitation pattern by extracting contours of the precipitation pattern in two of the images; assuming displacements between the contours as advection vectors; and propagating the advection vectors by iterating an operation using a moving average filter.

16. An apparatus as claimed in claim 3, wherein the image processing means evaluates the advection vectors in the image from a precipitation pattern by extracting contours of the precipitation pattern in two of the images; assuming displacements between the contours as advection vectors; and substituting the advection vectors as initial values of velocity vectors of a predetermined fluid equation and iterating time integral of the equation whereby velocity vectors are interpolated throughout the image, and the image processing means inputs evaluated velocity vectors based on the interpolation into the advection-diffusion equation system.

17. An apparatus as claimed in claim 15 or 16, wherein in the detection of the contours and the displacements therebetween:

image processing operations including binarization; labeling; elimination of isolated points; and erosion/dilation are previously performed for the pattern of the precipitation region;

a discrete contour is detected using a contour-searching algorithm; and regarding each contour point on the discrete contour, a displacement of the contour is calculated based on a distance, in the direction of a normal with respect to the contour in a past frame, from the contour point of the contour in the past frame to an intersection on a corresponding contour in the present frame.

18. An apparatus as claimed in claim 17, wherein the normal of the contour is defined using the central difference method.

19. An apparatus as claimed in claim 16, wherein the predetermined fluid equation is the Navier-Stokes equation.

20. An apparatus as claimed in claim 16, wherein the predetermined fluid equation is the Burgers equation.

21. An apparatus as claimed in claim 1, wherein the advection-diffusion equation system is transformed into a discrete form and is solved using, any one of the finite difference method, the finite element method, and the spectral method.

22. An apparatus as claimed in claim 2, wherein the topographical effect introducing means sets the advection vectors supplied to the advection-diffusion equation system in accordance with a topographical feature of the precipitation region.

23. An apparatus as claimed in claim 2, wherein the topographical effect introducing means sets the diffusion coefficients in accordance with a topographical feature of the precipitation region.

24. An apparatus as claimed in claim 1, wherein the advection-diffusion equation system includes dispersion coefficients and the topographical effect introducing means sets the dispersion coefficients in accordance with a topographical feature of the precipitation region.

25. An apparatus as claimed in claim 24, wherein if the pattern of the precipitation region passes through both ocean and land regions, larger dispersion coefficients are set for the ocean region in comparison with those set for the land region.

26. An apparatus as claimed in claim 1, wherein the calculation means iterates time integral of the advection-diffusion equation system with a time span shorter than a relevant observation period of the radar.

27. An apparatus as claimed in claim 10, wherein the image processing means determines advection vectors supplied to the advection-diffusion equation system based on a precipitation pattern, and in the determination:

first initial advection vectors are determined by extracting a change of the center of gravity of each region having the large edge-gradient;

second initial advection vectors are determined by dividing each frame into plural small blocks and calculating a direction and a distance relating to points having the highest similarity between two frames of the images based on the cross correlation method;

third initial advection vectors are determined by extracting contours of the precipitation pattern in two of the images and assuming displacements between the contours as the advection vectors; and an operation using a moving average filter is iterated with respect to the first, second and third initial advection vectors so as to evaluate overall advection vectors throughout the frame.

28. A meteorological radar precipitation pattern prediction apparatus comprising:

image input means for inputting radar images of a precipitation region;

image storage means for storing the input radar images as time-series two-dimensional images;

image processing means for outputting area-transition information of a precipitation region with respect to two or more two-dimensional past images stored in the image storage means as one-dimensional time-series signals;

function fitting means for fitting a non-linear function into the one-dimensional time-series signals by using the least square method;

prediction means for predicting future area-transition based on results of the function fitting; and output means for outputting a pattern transition of the precipitation region as time-series images based on predicted results.

29. An apparatus as claimed in claim 28, wherein the non-linear function is a quadratic function.

30. An apparatus as claimed in claim 28, wherein the prediction means predicts a maximum value at a switching point from increase to decrease of the area and/or a minimum value at a switching point from decrease to increase of the area.

31. A meteorological radar precipitation pattern prediction apparatus comprising:

image input for inputting radar images of a precipitation region;

image storage means for storing the input radar images as time-series two-dimensional images;

image transition detecting means for detecting an intensity transition between two or more two-dimensional past images stored in the image storage means;

image generating and vanishing means for generating or vanishing a local precipitation-region image according to the detected intensity transition by using an image processing method; and prediction means for predicting transition of a pattern with respect to the precipitation region based on results image-processed by the image generating and vanishing means; and output means for outputting predicted results as time-series images.

32. An apparatus as claimed in claim 31, wherein the image transition detecting means detects the intensity transition using an evaluation equation in which differences between the frames are summed.

33. An apparatus as claimed in claim 31, wherein the image generating and vanishing means iterates convolution integral calculation and inverse integral calculation thereof with respect to a Gaussian function and image data of the precipitation region.

34. An apparatus as claimed in claim 33, wherein the image generating and vanishing means provides intensity information for maintaining gray-levels of the image at a fixed level for each iteration.

35. A meteorological radar precipitation pattern prediction apparatus comprising:

image input means for inputting radar images of a precipitation region;

image storage means for storing the input radar images as time-series two-dimensional images;

image processing means for detecting and outputting intensity and area transitions between two or more two-dimensional past images stored in the image storage means as one-dimensional time-series signals;

precipitation-region growth and decay predicting means for predicting transition with respect to growth and decay of the precipitation region based on the one-dimensional time-series signals; and output means for outputting a pattern transition of the precipitation region as time-series images based on predicted results.

36. An apparatus as claimed in claim 35, wherein the image processing means divides each two-dimensional image into plural small blocks, and detects the area and intensity transition for each divided block.

37. An apparatus as claimed in claim 35, wherein the image processing means calculates the one-dimensional time-series signals by performing time-series calculation relating to each of area and intensity differences between images which are a predetermined number of frames apart from each other.

38. An apparatus as claimed in claim 37, wherein the image processing means determines a function of the intensity transition by calculating the first derivative with respect to each calculated difference.

39. An apparatus as claimed in claim 35, wherein the precipitation-region growth and decay predicting means calculates cross-correlation values relating to the area and intensity transitions by using a cross-correlation function and evaluates a time lag between both transitions.

40. An apparatus as claimed in any one of claims 1, 28, 31, and 35, wherein the two or more two-dimensional past images are selected according to a sampling rate and a moving velocity of a relevant object.

41. A meteorological radar precipitation pattern prediction method comprising the steps of:

inputting radar images of a precipitation region;

storing the input radar images as time-series two-dimensional images;

calculating various image-feature quantities with respect to two or more of the stored two-dimensional past images;

calculating a spatial-temporal transition of the amount of precipitation using an advection-diffusion equation system which indicates various physical effects relating to precipitation phenomena, with the various image-feature quantities as initial values;

predicting transition of a pattern with respect to the precipitation region based on results of the calculation; and outputting predicted results as time-series images.

42. A method as claimed in claim 41, wherein the advection-diffusion equation system includes diffusion coefficients and evaluated advection vectors, and the method further comprises the step of setting the diffusion coefficients and the advection vectors in accordance with topographical features of the precipitation region.

43. A method as claimed in claim 41, wherein the advection-diffusion equation system includes an advection term which is a product of an advection vector and the first derivative with respect to a gray-level of a relevant pixel.

44. A method as claimed in claim 41, wherein the step of calculating the image-feature quantities includes extracting a region having gray-levels greater than a fixed level from each input two-dimensional image and counting the number of pixels belonging to the extracted region, and determining the counted number of pixels as an area of a precipitation region in the relevant frame.

45. A method as claimed in claim 41, wherein the advection-diffusion equation system includes time, advection, diffusion, source, sink, and dispersion terms, and a gray-level at each pixel is supplied to the equation as a variable corresponding to an amount of precipitation.

46. A method as claimed in claim 45, wherein diffusion coefficients included in the diffusion term are set in accordance with a rate of change with respect to one-dimensional area transition.

47. A method as claimed in claim 46, wherein one-dimensional non-linear area transition is predicted using extrapolation by approximately fitting a predetermined non-linear function up to a predetermined prediction time, whereby the rate of change with respect to one-dimensional area transition is obtained and corresponding diffusion coefficients are changed according to the obtained rate.

48. A method as claimed in claim 45, wherein data relating to positive and negative regions which are determined by calculating difference between two of the two-dimensional past images are supplied to the source and sink terms of the equation, respectively.

49. A method as claimed in claim 41, wherein the image-feature quantities include an edge-gradient which is the first derivative of an gray-level.

50. A method as claimed in claim 49, wherein the step of calculating the image-feature quantities includes dividing the pattern of the precipitation region into one or more regions having a large edge-gradient and one or more regions having a small edge-gradient with respect to a predetermined value.

51. A method as claimed in claim 45, wherein the step of calculating the image-feature quantities includes dividing the pattern of the precipitation region into one or more regions having a large edge-gradient and one or more regions having a small edge-gradient with respect to a predetermined value, calculating the center of gravity of each region having the large edge-gradient, and weighting an amount of sinking relating to the sink term according to a distance from the center of gravity, and in proportion to the distance from the center of gravity, a larger dispersion coefficient is supplied to the dispersion term.

52. A method as claimed in claim 50, wherein advection vectors supplied to the advection-diffusion equation system are set by extracting a shift of the center of gravity of each region having the large edge-gradient.

53. A method as claimed in claim 52, wherein if advection in the relevant precipitation region is strong, a shift of the center of gravity of each region having the small edge-gradient is also extracted so as to set the advection vectors.

54. A method as claimed in claim 43, wherein the step of calculating the image-feature quantities includes determining the advection vectors of the pattern of the precipitation region by dividing each frame into plural small blocks and calculating a direction and a distance relating to points having the highest similarity between two frames of the images based on the Cross Correlation method, and evaluating overall advection vectors throughout the frame by iterating an operation using a moving average filter.

55. A method as claimed in claim 43, wherein the step of calculating the image-feature quantities includes evaluating the advection vectors in the image from a precipitation pattern by extracting contours of the precipitation pattern in two of the images; assuming displacements between the contours as advection vectors; and by propagating the advection vectors by iterating an operation using a moving average filter.

56. A method as claimed in claim 43, wherein the step of calculating the image-feature quantities includes evaluating the advection vectors in the image from a precipitation pattern by extracting contours of the precipitation pattern in two of the images; assuming displacements between the contours as advection vectors; and by substituting the advection vectors as initial values of velocity vectors of a predetermined fluid equation and iterating time integral of the equation whereby velocity vectors are interpolated throughout the image, and the step further includes inputs evaluated velocity vectors based on the interpolation into the advection-diffusion equation system.

57. A method as claimed in claim 55 or 56, wherein in the detection of the contours and the displacements therebetween:
   image processing operations including binarization; labeling; elimination of isolated points; and erosion/dilation are previously performed for the pattern of the precipitation region;
   a discrete contour is detected using a contour-searching algorithm; and
   regarding each contour point on the discrete contour, a displacement of the contour is calculated based on a distance, in the direction of a normal with respect to the contour in a past frame, from the contour point of the contour in the past frame to an intersection on a corresponding contour in the present frame.

58. A method as claimed in claim 57, wherein the normal of the contour is defined using the central difference method.

59. A method as claimed in claim 56, wherein the predetermined fluid equation is the Navier-Stokes equation.

60. A method as claimed in claim 56, wherein the predetermined fluid equation is the Burgers equation.

61. A method as claimed in claim 41, wherein the advection-diffusion equation system is transformed into a discrete form and is solved using any one of the finite difference method, the finite element method, and the spectral method.

62. A method as claimed in claim 42, wherein the step of setting the diffusion coefficients and the advection vectors includes setting the advection vectors supplied to the advection-diffusion equation system in accordance with a topographical feature of the precipitation region.

63. A method as claimed in claim 42, wherein the step of setting the diffusion coefficients and the advection vectors includes setting the diffusion coefficients in accordance with a topographical feature of the precipitation region.

64. A method as claimed in claim 41, wherein the advection-diffusion equation system includes dispersion coefficients and the step of setting the diffusion coefficients and the advection vectors includes setting the dispersion coefficients in accordance with a topographical feature of the precipitation region.

65. A method as claimed in claim 64, wherein if the pattern of the precipitation region passes through both ocean and land regions, larger dispersion coefficients are set for the ocean region in comparison with those set for the land region.

66. A method as claimed in claim 41, wherein the step of calculating a spatial-temporal transition using the advection-diffusion equation system includes iterating time integral of the advection-diffusion equation system with a time span shorter than a relevant observation period of the radar.

67. A method as claimed in claim 50, wherein the step of calculating the image-feature quantities includes determining advection vectors supplied to the advection-diffusion equation system based on a precipitation pattern, and in the determination:

first initial advection vectors are determined by extracting a change of the center of gravity of each region having the large edge-gradient;

second initial advection vectors are determined by dividing each frame into plural small blocks and calculating a direction and a distance relating to points having the highest similarity between two frames of the images based on the cross correlation method;

third initial advection vectors are determined by extracting contours of the precipitation pattern in two of the images and assuming displacements between the contours as the advection vectors; and an operation using a moving average filter is iterated with respect to the first, second and third initial advection vectors so as to evaluate overall advection vectors throughout the frame.

68. A meteorological radar precipitation pattern prediction method comprising the steps of:

inputting radar images of a precipitation region;

storing the input radar images as time-series two-dimensional images;

outputting area-transition information of a precipitation region with respect to two or more of the stored two-dimensional past images as one-dimensional time-series signals;

fitting a non-linear function into the one-dimensional time-series signals by using the least square method;

predicting future area-transition based on results of the function fitting; and outputting a pattern transition of the precipitation region as time-series images based on predicted results.

69. A method as claimed in claim 68, wherein the non-linear function is a quadratic function.

70. A method as claimed in claim 68, wherein the step of predicting future area-transition includes predicting a maximum value at a switching point from increase to decrease of the area and/or a minimum value at a switching point from decrease to increase of the area.

71. A method as claimed in one of claims 41 and 68, wherein the two or more two-dimensional past images are selected according to a sampling rate and a moving velocity of a relevant object.

72. A gas-distribution pattern prediction apparatus comprising:

image input means for inputting gas-distribution images of gas distributed in the air;

image storage means for storing the input images as time-series two-dimensional images;

image processing means for calculating various image-feature quantities with respect to two or more two-dimensional past images stared in the image storage means;

calculation means for calculating a spatial-temporal transition of the distributed gas using an advection-diffusion equation system which indicates various physical effects relating to gas discharged into the air, with the various image-feature quantities as initial values;

prediction means for predicting transition of a pattern with respect to the gas distribution based on results calculated by the calculation means; and output means for outputting predicted results as time-series images.

73. A gas-distribution pattern prediction method comprising the steps of:

inputting gas-distribution images of gas distributed in the air;

storing the input images as time-series two-dimensional images;

calculating various image-feature quantities with respect to two or more of the stored two-dimensional past images;

calculating a spatial-temporal transition of the distributed gas using an advection-diffusion equation system which indicates various physical effects relating to gas discharged into the air, with the various image-feature quantities as initial values;

predicting transition of a pattern with respect to the gas distribution based on results of the calculation; and outputting predicted results as time-series images.

74. A storage medium storing a computer program for making a computer execute any one of the methods claimed in claims 41, 68, and 73.

* * * * *